(12) United States Patent
Williams et al.

(10) Patent No.: US 11,947,784 B2
(45) Date of Patent: Apr. 2, 2024

(54) USER INTERFACE FOR INITIATING A TELEPHONE CALL

(71) Applicant: Apple Inc., Cupertino, CA (US)

(72) Inventors: Aled Hywel Williams, San Francisco, CA (US); Jonathan P. Ive, San Jose, CA (US); Bronwyn Jones, San Francisco, CA (US); Ieyuki Kawashima, San Jose, CA (US); Kevin Lynch, Woodside, CA (US); Natalia Maric, San Francisco, CA (US); Andreas E. Schobel, San Francisco, CA (US); Molly Pray Wiebe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/349,191

(22) Filed: Jun. 16, 2021

(65) Prior Publication Data

US 2021/0311613 A1    Oct. 7, 2021

Related U.S. Application Data

(63) Continuation of application No. 15/424,186, filed on Feb. 3, 2017, now abandoned.
(Continued)

(51) Int. Cl.
*G06F 3/04842* (2022.01)
*G06F 3/01* (2006.01)
(Continued)

(52) U.S. Cl.
CPC .......... *G06F 3/04842* (2013.01); *G06F 3/016* (2013.01); *G06F 3/04817* (2013.01);
(Continued)

(58) Field of Classification Search
CPC ............... G06F 3/0488; G06F 3/04883; G06F 3/04842; G06F 3/04886; G06F 3/017;
(Continued)

(56) References Cited

U.S. PATENT DOCUMENTS 5,146,231 A    9/1992  Ghaem et al.
5,303,286 A    4/1994  Wiedeman
(Continued)

FOREIGN PATENT DOCUMENTS

CN    201928419 U    8/2011
CN    102215295 A    10/2011
(Continued)

OTHER PUBLICATIONS

K. Inso, P. Noicharoen, N. Meathatanunchai and A. Khurat, "Play it safe a personal security application on Android platform," 2016 Fifth ICT International Student Project Conference (ICT-ISPC), May 27-28, 2016, pp. 133-136, doi: 10.1109/ICT-ISPC.2016.7519254. (Year: 2016).*
(Continued)

*Primary Examiner* — Andrew L Tank
(74) *Attorney, Agent, or Firm* — DLA Piper LLP (US)

(57) ABSTRACT

An electronic device with a touch-sensitive display, one or more processors, and memory detects a first user input. In response to detecting the first user input, the device displays on the touch-sensitive display a user interface screen including a first affordance and a second affordance. The device detects a second user input including a contact on the touch-sensitive display. In accordance with a determination that the contact corresponds to selection of the first affordance, the electronic device is caused to turn off. In accordance with a determination that the contact corresponds to selection of the second affordance, the device causes initiation of a telephone call to a determined number.

42 Claims, 29 Drawing Sheets

Related U.S. Application Data

(60) Provisional application No. 62/348,883, filed on Jun. 11, 2016.

(51) Int. Cl.
    *G06F 3/04817* (2022.01)
    *G06F 3/0482* (2013.01)
    *G06F 3/04883* (2022.01)
    *G06F 3/04886* (2022.01)
    *H04M 1/72469* (2021.01)

(52) U.S. Cl.
    CPC ........ *G06F 3/0482* (2013.01); *G06F 3/04883* (2013.01); *G06F 3/04886* (2013.01); *H04M 1/72469* (2021.01); *H04M 2250/22* (2013.01)

(58) Field of Classification Search
    CPC .... G06F 3/016; G06F 3/04817; G06F 3/0482; G06F 3/01; H04W 4/90; H04W 4/02; H04W 4/029; H04W 4/14; H04M 1/667; H04M 1/72469; G08B 25/016
    See application file for complete search history.

(56) References Cited

U.S. PATENT DOCUMENTS

| | | |
|---|---|---|
| 5,446,465 A | 8/1995 | Diefes et al. |
| 5,583,514 A | 12/1996 | Fulop |
| 5,587,717 A | 12/1996 | Jang |
| 5,812,932 A | 9/1998 | Wiedeman et al. |
| 5,863,057 A | 1/1999 | Wessels |
| 5,937,349 A | 8/1999 | Andresen |
| 5,995,041 A | 11/1999 | Bradley et al. |
| 6,006,068 A | 12/1999 | Elkin et al. |
| 6,052,587 A | 4/2000 | Moraes et al. |
| 6,108,538 A | 8/2000 | Blasiak et al. |
| 6,147,644 A | 11/2000 | Castles et al. |
| 6,157,896 A | 12/2000 | Castles et al. |
| 6,169,881 B1 | 1/2001 | Astrom et al. |
| 6,208,858 B1 | 3/2001 | Antonio et al. |
| 6,240,366 B1 | 5/2001 | Nagatsuma et al. |
| 6,263,280 B1 | 7/2001 | Stingone, Jr. |
| 6,272,316 B1 | 8/2001 | Wiedeman et al. |
| 6,278,861 B1 | 8/2001 | Ward et al. |
| 6,317,689 B1 | 11/2001 | Lee |
| 6,549,848 B1 | 4/2003 | Green et al. |
| 6,580,452 B1 | 6/2003 | Gangitano |
| 6,690,934 B1 | 2/2004 | Conrad et al. |
| 6,763,226 B1 | 7/2004 | Mczeal, Jr. |
| 6,992,991 B2 | 1/2006 | Duske et al. |
| 7,184,744 B1 | 2/2007 | Schnabel |
| 7,233,795 B1 | 6/2007 | Ryden |
| 7,593,749 B2 | 9/2009 | Vallström et al. |
| 7,890,134 B2 | 2/2011 | Richardson et al. |
| 8,249,585 B2 | 8/2012 | Tronc et al. |
| 8,254,970 B1 | 8/2012 | Oshinsky et al. |
| 8,521,122 B2 | 8/2013 | Scott et al. |
| 8,676,121 B1 | 3/2014 | Monte et al. |
| 8,688,450 B2 * | 4/2014 | Lloyd .................. H04M 1/271 704/231 |
| 8,811,951 B1 | 8/2014 | Faaborg et al. |
| 8,855,012 B1 | 10/2014 | Suri |
| 9,037,164 B2 | 5/2015 | Keerthi |
| 9,100,944 B2 | 8/2015 | Sauhta et al. |
| 9,191,988 B2 | 11/2015 | Newham |
| 9,235,923 B1 | 1/2016 | Robinson et al. |
| 9,369,832 B1 | 6/2016 | Noble et al. |
| 9,400,489 B2 | 7/2016 | Kim et al. |
| 9,477,208 B2 | 10/2016 | Park et al. |
| 9,503,177 B1 | 11/2016 | Shi et al. |
| 9,521,378 B1 | 12/2016 | Palaganas et al. |
| 10,116,893 B1 | 10/2018 | Reis et al. |
| 10,459,504 B2 | 10/2019 | Veloso et al. |
| 10,560,562 B1 | 2/2020 | Tandon |
| 10,645,561 B1 | 5/2020 | Guo et al. |
| 10,791,536 B1 | 9/2020 | Murphy |
| 10,797,785 B1 | 10/2020 | Rhee |
| 10,853,410 B2 | 12/2020 | Herz |
| 10,959,074 B1 | 3/2021 | Shuman et al. |
| 11,003,315 B2 | 5/2021 | Sung et al. |
| 11,349,559 B1 | 5/2022 | Reuss et al. |
| 2002/0000931 A1 | 1/2002 | Petronic et al. |
| 2002/0115478 A1 | 8/2002 | Fujisawa et al. |
| 2003/0081506 A1 | 5/2003 | Karhu et al. |
| 2003/0083816 A1 | 5/2003 | Imakado et al. |
| 2004/0166811 A1 | 8/2004 | Moon |
| 2004/0257275 A1 | 12/2004 | Yee et al. |
| 2006/0017612 A1 | 1/2006 | Nagatani |
| 2006/0019649 A1 | 1/2006 | Feinleib et al. |
| 2006/0030334 A1 | 2/2006 | Hashimoto |
| 2006/0095563 A1 | 5/2006 | Benjamin et al. |
| 2006/0247915 A1 | 11/2006 | Bradford et al. |
| 2006/0258365 A1 | 11/2006 | Cha et al. |
| 2007/0109186 A1 | 5/2007 | Fujiwara et al. |
| 2007/0123252 A1 | 5/2007 | Tronc et al. |
| 2007/0130606 A1 | 6/2007 | Jeong |
| 2007/0142028 A1 | 6/2007 | Ayoub et al. |
| 2007/0150842 A1 | 6/2007 | Chaudhri et al. |
| 2007/0188380 A1 | 8/2007 | Duong et al. |
| 2008/0057926 A1 | 3/2008 | Forstall et al. |
| 2008/0076410 A1 | 3/2008 | Beyer |
| 2008/0166011 A1 | 7/2008 | Sever et al. |
| 2008/0168290 A1 | 7/2008 | Jobs et al. |
| 2008/0292074 A1 | 11/2008 | Boni et al. |
| 2008/0303715 A1 | 12/2008 | Wang et al. |
| 2008/0313686 A1 | 12/2008 | Matvey |
| 2009/0049905 A1 | 2/2009 | Lawhite et al. |
| 2009/0051649 A1 | 2/2009 | Rondel |
| 2009/0135062 A1 | 5/2009 | Hori |
| 2009/0191854 A1 | 7/2009 | Beason |
| 2009/0191893 A1 | 7/2009 | Smith |
| 2009/0205041 A1 | 8/2009 | Michalske |
| 2009/0241072 A1 | 9/2009 | Chaudhri et al. |
| 2009/0262033 A1 | 10/2009 | King et al. |
| 2009/0267828 A1 | 10/2009 | Kobayashi et al. |
| 2009/0279674 A1 | 11/2009 | Roberts |
| 2010/0083159 A1 | 4/2010 | Mountain et al. |
| 2010/0085255 A1 | 4/2010 | Wakabayashi |
| 2010/0167672 A1 | 7/2010 | Ahn et al. |
| 2010/0257490 A1 | 10/2010 | Lyon et al. |
| 2010/0271312 A1 | 10/2010 | Alameh et al. |
| 2010/0272250 A1 | 10/2010 | Yap et al. |
| 2010/0311385 A1 | 12/2010 | Hurwitz |
| 2011/0003587 A1 | 1/2011 | Belz et al. |
| 2011/0088003 A1 * | 4/2011 | Swink ............... H04M 1/72436 455/411 |
| 2011/0092158 A1 | 4/2011 | Plamondon |
| 2011/0136428 A1 | 6/2011 | Ritter |
| 2011/0157046 A1 | 6/2011 | Lee et al. |
| 2011/0183650 A1 | 7/2011 | McKee |
| 2011/0230161 A1 | 9/2011 | Newman |
| 2011/0248948 A1 | 10/2011 | Griffin et al. |
| 2011/0291974 A1 | 12/2011 | Son et al. |
| 2011/0306292 A1 | 12/2011 | Wilson et al. |
| 2011/0306393 A1 | 12/2011 | Goldman et al. |
| 2012/0015622 A1 * | 1/2012 | Kuz .................... H04M 3/5116 455/404.1 |
| 2012/0068899 A1 | 3/2012 | Ayotte et al. |
| 2012/0135715 A1 | 5/2012 | Kang et al. |
| 2012/0140767 A1 | 6/2012 | Brothers et al. |
| 2012/0218177 A1 | 8/2012 | Pang et al. |
| 2012/0237002 A1 | 9/2012 | Sennett et al. |
| 2012/0302200 A1 | 11/2012 | Esbensen |
| 2013/0026293 A1 | 1/2013 | Schneider et al. |
| 2013/0045708 A1 * | 2/2013 | Nguyen ................. H04M 11/04 455/404.1 |
| 2013/0063364 A1 | 3/2013 | Moore |
| 2013/0115932 A1 | 5/2013 | Williams et al. |
| 2013/0120106 A1 | 5/2013 | Cauwels et al. |
| 2013/0127665 A1 | 5/2013 | Miller et al. |
| 2013/0135146 A1 | 5/2013 | Ransom et al. |
| 2013/0183924 A1 | 7/2013 | Saigh et al. |
| 2013/0189963 A1 | 7/2013 | Epp et al. |
| 2013/0197951 A1 | 8/2013 | Watson et al. |

(56) References Cited

U.S. PATENT DOCUMENTS

| | | | |
|---|---|---|---|
| 2013/0205350 A1 | 8/2013 | Ling et al. | |
| 2013/0225118 A1 | 8/2013 | Jang et al. | |
| 2013/0231077 A1* | 9/2013 | Cahill | G06F 3/0488 455/404.2 |
| 2013/0234924 A1 | 9/2013 | Janefalkar et al. | |
| 2013/0243924 A1 | 9/2013 | Bhandari et al. | |
| 2013/0262298 A1 | 10/2013 | Morley et al. | |
| 2013/0271319 A1 | 10/2013 | Trerise | |
| 2013/0271320 A1 | 10/2013 | Trerise | |
| 2013/0295872 A1 | 11/2013 | Guday et al. | |
| 2013/0301521 A1 | 11/2013 | Abdi | |
| 2013/0326642 A1* | 12/2013 | Hajj | G06F 3/014 726/34 |
| 2014/0003597 A1 | 1/2014 | Lazaridis et al. | |
| 2014/0022192 A1 | 1/2014 | Hatanaka | |
| 2014/0028601 A1 | 1/2014 | Moore et al. | |
| 2014/0064155 A1 | 3/2014 | Evans et al. | |
| 2014/0073256 A1 | 3/2014 | Newham et al. | |
| 2014/0134969 A1 | 5/2014 | Jin et al. | |
| 2014/0181183 A1 | 6/2014 | Yamamoto et al. | |
| 2014/0213214 A1 | 7/2014 | Reis | |
| 2014/0245783 A1 | 9/2014 | Proud et al. | |
| 2014/0327629 A1* | 11/2014 | Jobs | G06F 3/0488 345/173 |
| 2015/0011220 A1 | 1/2015 | Buckle et al. | |
| 2015/0018040 A1 | 1/2015 | He et al. | |
| 2015/0052618 A1 | 2/2015 | Michalske | |
| 2015/0063428 A1 | 3/2015 | Lever | |
| 2015/0097687 A1 | 4/2015 | Sloo et al. | |
| 2015/0137972 A1 | 5/2015 | Nepo | |
| 2015/0257126 A1 | 9/2015 | Herz | |
| 2015/0271317 A1 | 9/2015 | Nelson et al. | |
| 2015/0319284 A1 | 11/2015 | Leonessi | |
| 2015/0338524 A1 | 11/2015 | Ben Moshe et al. | |
| 2015/0350296 A1* | 12/2015 | Yang | G06F 3/04892 715/740 |
| 2015/0350448 A1 | 12/2015 | Coffman et al. | |
| 2016/0036996 A1 | 2/2016 | Midholt et al. | |
| 2016/0056525 A1 | 2/2016 | Hansryd et al. | |
| 2016/0057595 A1 | 2/2016 | Ahmed et al. | |
| 2016/0065669 A1 | 3/2016 | Van Dijkman et al. | |
| 2016/0065707 A1 | 3/2016 | Yang et al. | |
| 2016/0065708 A1 | 3/2016 | Yang et al. | |
| 2016/0066277 A1 | 3/2016 | Yang et al. | |
| 2016/0088455 A1 | 3/2016 | Bozik et al. | |
| 2016/0183098 A1 | 6/2016 | Lim | |
| 2016/0277903 A1 | 9/2016 | Poosala et al. | |
| 2016/0302083 A1 | 10/2016 | Durick et al. | |
| 2016/0306051 A1 | 10/2016 | Hirabayashi et al. | |
| 2016/0342141 A1 | 11/2016 | Koumaiha et al. | |
| 2016/0374047 A1 | 12/2016 | Reis | |
| 2017/0021260 A1 | 1/2017 | Willett et al. | |
| 2017/0026110 A1 | 1/2017 | Richardson et al. | |
| 2017/0045623 A1 | 2/2017 | Zlogar et al. | |
| 2017/0085600 A1 | 3/2017 | Carter et al. | |
| 2017/0150060 A1 | 5/2017 | Herz | |
| 2017/0171636 A1 | 6/2017 | Devlin et al. | |
| 2017/0180964 A1 | 6/2017 | Mehta et al. | |
| 2017/0357411 A1 | 12/2017 | Williams et al. | |
| 2018/0040951 A1 | 2/2018 | Uchiyama | |
| 2018/0088242 A1 | 3/2018 | Eagling | |
| 2018/0092057 A1 | 3/2018 | Yamashita et al. | |
| 2018/0192264 A1 | 7/2018 | Kwok et al. | |
| 2018/0270000 A1 | 9/2018 | Reis et al. | |
| 2018/0316416 A1 | 11/2018 | Reis et al. | |
| 2018/0316885 A1 | 11/2018 | Reis et al. | |
| 2018/0338237 A1 | 11/2018 | Maheswaranathan | |
| 2018/0338334 A1 | 11/2018 | Jin et al. | |
| 2019/0049592 A1 | 2/2019 | Koontz et al. | |
| 2019/0190591 A1 | 6/2019 | Wang et al. | |
| 2019/0280788 A1 | 9/2019 | Hardy et al. | |
| 2019/0387092 A1 | 12/2019 | Tessier | |
| 2020/0025944 A1 | 1/2020 | Mellier et al. | |
| 2020/0053641 A1 | 2/2020 | Lee et al. | |
| 2020/0132644 A1 | 4/2020 | Micalizzi et al. | |
| 2020/0187295 A1 | 6/2020 | Li et al. | |
| 2020/0252780 A1 | 8/2020 | Mcclendon et al. | |
| 2020/0304444 A1 | 9/2020 | Aneja et al. | |
| 2020/0367069 A1 | 11/2020 | Struhsaker et al. | |
| 2021/0006287 A1 | 1/2021 | Peeters et al. | |
| 2021/0011173 A1 | 1/2021 | Rhee | |
| 2021/0120394 A1 | 4/2021 | Martin et al. | |
| 2021/0144539 A1 | 5/2021 | Edge et al. | |
| 2021/0168581 A1 | 6/2021 | Van Den Dungen | |
| 2021/0175963 A1 | 6/2021 | Chang et al. | |
| 2021/0311203 A1 | 10/2021 | Reis et al. | |
| 2022/0066048 A1 | 3/2022 | Diggelen et al. | |
| 2022/0091737 A1 | 3/2022 | Bower et al. | |
| 2022/0116105 A1 | 4/2022 | Robinson et al. | |
| 2022/0256631 A1 | 8/2022 | Jain et al. | |
| 2023/0063173 A1 | 3/2023 | Caro et al. | |
| 2023/0065219 A1 | 3/2023 | Caro et al. | |
| 2023/0066232 A1 | 3/2023 | Caro et al. | |
| 2023/0081032 A1 | 3/2023 | Ardaud et al. | |
| 2023/0308538 A1 | 9/2023 | Caro et al. | |
| 2023/0328171 A1 | 10/2023 | Caro et al. | |

FOREIGN PATENT DOCUMENTS

| | | |
|---|---|---|
| CN | 102695302 A | 9/2012 |
| CN | 102752448 A | 10/2012 |
| CN | 101938287 B | 6/2013 |
| CN | 103297610 A | 9/2013 |
| CN | 104168367 A | 11/2014 |
| CN | 104205785 A | 12/2014 |
| CN | 105554225 A | 5/2016 |
| EP | 0963061 A2 | 12/1999 |
| EP | 2247087 A1 | 11/2010 |
| EP | 2981000 A1 | 2/2016 |
| GB | 2505476 A | 3/2014 |
| WO | 2014/105276 A1 | 7/2014 |
| WO | 2014/200731 A1 | 12/2014 |
| WO | 2015/192277 A1 | 12/2015 |
| WO | 2016/116814 A1 | 7/2016 |

OTHER PUBLICATIONS

B. Fernandes, V. Gomes, J. Ferreira and A. Oliveira, "Mobile Application for Automatic Accident Detection and Multimodal Alert," 2015 IEEE 81st Vehicular Technology Conference (VTC Spring), May 11-14, 2015, pp. 1-5, doi: 10.1109/VTCSpring.2015. 7145935. (Year: 2015).*
A. B. Faiz, A. Imteaj and M. Chowdhury, "Smart vehicle accident detection and alarming system using a smartphone," 2015 International Conference on Computer and Information Engineering (ICCIE), Nov. 26-27, 2015, pp. 66-69, doi: 10.1109/CCIE.2015.7399319. (Year: 2015).*
D. Chand, S. Nayak, K. S. Bhat, S. Parikh, Y. Singh and A. A. Kamath, "A mobile application for Women's Safety: WoSApp," TENCON 2015—2015 IEEE Region 10 Conference, Nov. 1-4, 2015, pp. 1-5, doi: 10.1109/TENCON.2015.7373171. (Year: 2015).*
Certificate of Examination received for Australian Patent Application No. 2019101260, dated Mar. 25, 2020, 2 pages.
Extended European Search Report received for European Patent Application No. 17810730.6, dated Nov. 29, 2019, 12 pages.
Notice of Acceptance received for Australian Patent Application No. 2019250182, dated Mar. 11, 2021, 3 pages.
Office Action received for Australian Patent Application No. 2019101260, dated Dec. 16, 2019, 3 pages.
Office Action received for Australian Patent Application No. 2019250182, dated Aug. 18, 2020, 4 pages.
Office Action received for Australian Patent Application No. 2019250182, dated Dec. 2, 2020, 5 pages.
Office Action received for Chinese Patent Application No. 201780033617.5, dated Apr. 2, 2021, 24 pages (13 pages of English Translation and 11 pages of Official Copy).
Office Action received for Chinese Patent Application No. 201780033617.5, dated Apr. 20, 2020, 24 pages (13 pages of English Translation and 11 pages of Official Copy).

(56) References Cited

OTHER PUBLICATIONS

Office Action received for Chinese Patent Application No. 201780033617.5, dated Sep. 29, 2020, 26 pages (15 pages of English Translation and 11 pages of Official Copy).
Peters Jay, "The iPhone 13's rumored satellite link sounds like it's just for emergencies", The Verge, Available online at: https://apple.news/A-xX1QS6IT2m818PPKtL52Q, Aug. 30, 2021, 2 pages.
Decision on Appeal received for U.S. Appl. No. 15/424,186, dated May 7, 2021, 12 pages.
Examiner's Answer to Appeal Brief received for U.S. Appl. No. 15/424,186, dated Oct. 7, 2020, 8 pages.
Final Office Action received for U.S. Appl. No. 14/503,327, dated May 18, 2017, 10 pages.
Final Office Action received for U.S. Appl. No. 14/841,623, dated Sep. 5, 2017, 16 pages.
Final Office Action received for U.S. Appl. No. 15/424,186, dated Aug. 9, 2019, 18 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/046787, dated Mar. 16, 2017, 19 pages.
International Preliminary Report on Patentability received for PCT Patent Application No. PCT/US2017/035155, dated Dec. 20, 2018, 15 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/046787, dated Apr. 1, 2016, 26 pages.
International Search Report and Written Opinion received for PCT Patent Application No. PCT/US2017/035155, dated Oct. 2, 2017, 19 pages.
Invitation to Pay Additional Fees received for PCT Patent Application No. PCT/US2015/046787, dated Dec. 15, 2015, 8 pages.
Invitation to Pay Additional Fees received for PCT Patent Application No. PCT/US2017/035155, dated Aug. 3, 2017, 2 pages.
Iphone, "User Guide for iOS 7.1 Software", Mar. 2014, 162 pages.
Non Final Office Action received for U.S. Appl. No. 14/503,327, dated Sep. 12, 2016, 10 pages.
Non-Final Office Action received for U.S. Appl. No. 14/841,608, dated Apr. 12, 2017, 9 pages.
Non-Final Office Action received for U.S. Appl. No. 14/841,614, dated Jul. 27, 2017, 13 pages.
Non-Final Office Action received for U.S. Appl. No. 14/841,623, dated Feb. 2, 2017, 17 pages.
Non-Final Office Action received for U.S. Appl. No. 15/424,186, dated Jan. 11, 2019, 15 pages.
Office Action received for Australian Patent Application No. 2017277838, dated Aug. 20, 2019, 3 pages.
Office Action received for Australian Patent Application No. 2017277838, dated Jun. 5, 2019, 3 pages.
Office Action received for Taiwanese Patent Application No. 104128519, dated Mar. 29, 2017, 16 pages.
Record of Oral Hearing received for U.S. Appl. No. 15/424,186, dated May 10, 2021, 12 pages.
Samsung, "SM-G900F User Manual", English (EU). Rev. 1.0, Mar. 2014, 249 pages.
Office Action received for Chinese Patent Application No. 201780033617.5, dated Sep. 30, 2021, 16 pages (10 pages of English Translation and 6 pages of Official Copy).
Office Action received for European Patent Application No. 17810730.6, dated Aug. 18, 2021, 12 pages.
Extended European Search Report received for European Patent Application No. 22197456.1, dated Feb. 2, 2023, 9 pages.
International Search Report and Written Opinion received for PCT Patent Application No. PCT/US2022/042069, dated Feb. 14, 2023, 22 pages.
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Final Office Action received for U.S. Appl. No. 17/899,510, dated Jun. 2, 2023, 15 pages.
Non-Final Office Action received for U.S. Appl. No. 17/899,530, dated May 25, 2023, 68 pages.
Office Action received for Australian Patent Application No. 2022235630, dated May 17, 2023, 3 pages.
Applicant Initiated Interview Summary received for U.S. Appl. No. 17/899,510, dated Apr. 27, 2023, 2 pages.
Applicant-Initiated Interview Summary received for U.S. Appl. No. 17/899,315, dated Jan. 24, 2023, 3 pages.
Applicant-Initiated Interview Summary received for U.S. Appl. No. 17/899,530, dated Feb. 3, 2023, 6 pages.
Extended European Search Report received for European Patent Application No. 22197430.6, dated Jan. 26, 2023, 8 pages.
Invitation to Pay Additional Fees and Partial International Search Report received for PCT Patent Application No. PCT/US2022/042069, dated Dec. 22, 2022, 14 pages.
Non-Final Office Action received for U.S. Appl. No. 17/899,315, dated Dec. 22, 2022, 20 pages.
Non-Final Office Action received for U.S. Appl. No. 17/899,315, dated Nov. 4, 2022, 20 pages.
Non-Final Office Action received for U.S. Appl. No. 17/899,530, dated Jan. 3, 2023, 67 pages.
Clark Mitchell, "Qualcomm's going toe-to-toe with Apple's satellite messaging feature", Available online at: https://www.theverge.com/2023/1/5/23538207/qualcomm-satellite-messaging-snapdragon-android, Jan. 6, 2023, 18 pages.
Final Office Action received for U.S. Appl. No. 17/899,530, dated Mar. 8, 2023, 68 pages.
Non-Final Office Action received for U.S. Appl. No. 17/899,510, dated Mar. 16, 2023, 16 pages.
Notice of Allowance received for U.S. Appl. No. 17/899,315, dated Feb. 24, 2023, 9 pages.
Applicant-Initiated Interview Summary received for U.S. Appl. No. 17/899,530, dated Apr. 3, 2023, 5 pages.
International Search Report and Written Opinion received for PCT Patent Application No. PCT/US2022/043183, dated Jan. 23, 2023, 17 pages.
Invitation to Pay Additional Fees received for PCT Patent Application No. PCT/US2022/043183, dated Nov. 30, 2022, 10 pages.
Corrected Notice of Allowance received for U.S. Appl. No. 17/899,530, dated Nov. 8, 2023, 3 pages.
Non-Final Office Action received for U.S. Appl. No. 17/899,510, dated Oct. 26, 2023, 18 pages.
Notice of Acceptance received for Australian Patent Application No. 2022235630, dated Sep. 28, 2023, 3 pages.
Notice of Allowance received for U.S. Appl. No. 17/899,530, dated Oct. 19, 2023, 13 pages.
Applicant-Initiated Interview Summary received for U.S. Appl. No. 17/899,510, dated Aug. 2, 2023, 2 pages.
Applicant-Initiated Interview Summary received for U.S. Appl. No. 17/899,530, dated Jul. 3, 2023, 6 pages.
Notice of Acceptance received for Australian Patent Application No. 2023204622, dated Aug. 10, 2023, 3 pages.
Office Action received for Australian Patent Application No. 2022235630, dated Jul. 21, 2023, 6 pages.
Office Action received for European Patent Application No. 17810730.6, dated Jul. 6, 2023, 13 pages.

* cited by examiner

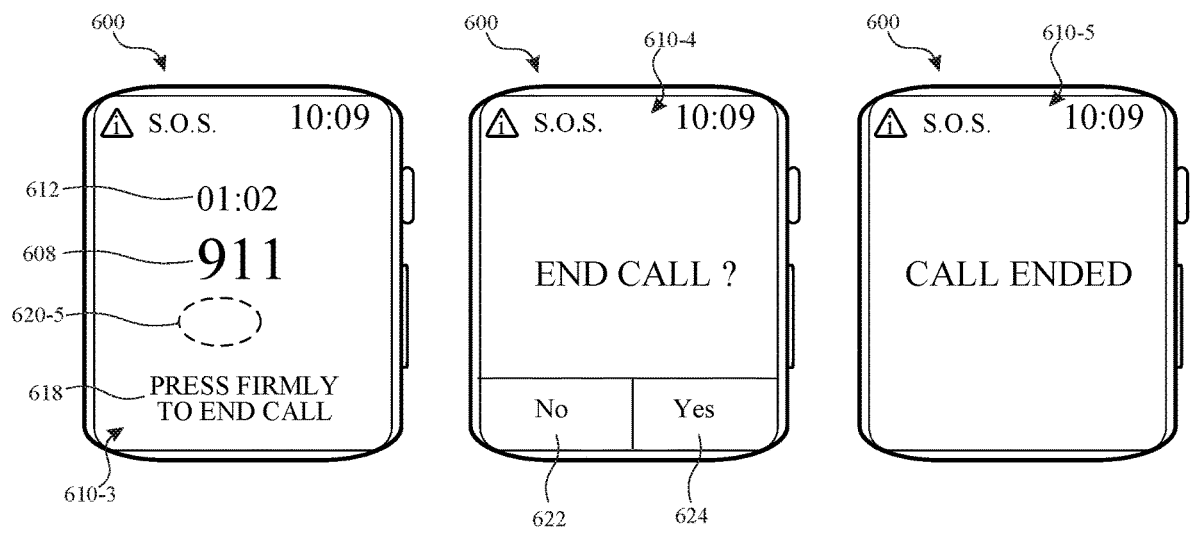

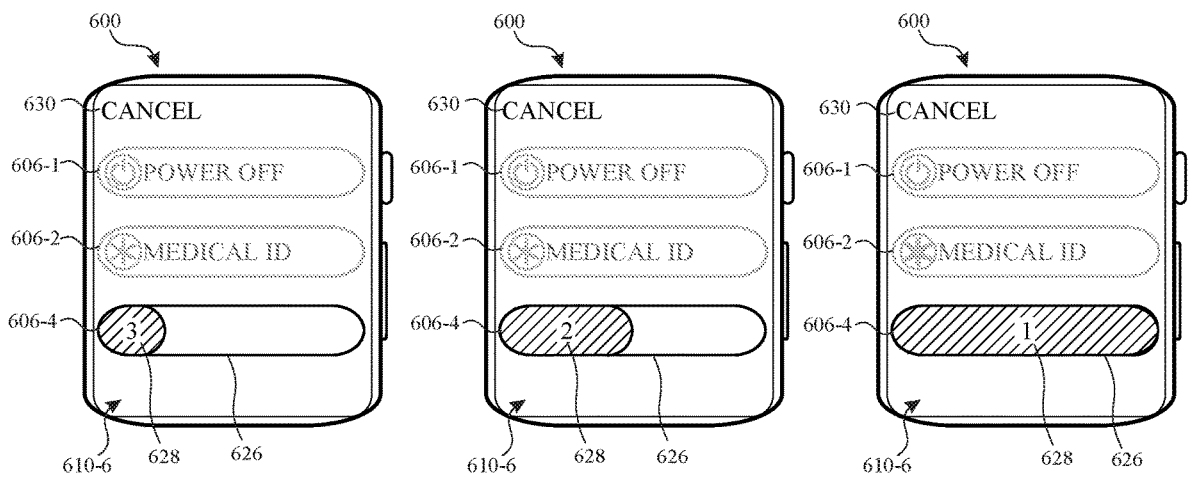

USER INTERFACE FOR INITIATING A TELEPHONE CALL

CROSS-REFERENCE TO RELATED APPLICATIONS

This application is a continuation of U.S. patent application Ser. No. 15/424,186, titled "USER INTERFACE FOR INITIATING A TELEPHONE CALL," filed Feb. 3, 2017, which claims priority to U.S. Provisional Patent Application Ser. No. 62/348,883, titled "USER INTERFACE FOR INITIATING A TELEPHONE CALL," filed Jun. 11, 2016, the content of which is hereby incorporated by reference in its entirety.

FIELD

The present disclosure relates generally to computer user interfaces, and more specifically to techniques for initiating a telephone call.

BACKGROUND

Some electronic devices such as smartphones include functionality for making telephone calls and sending messages. Techniques for making a call or sending a message include dialing a number on a keypad, selecting a contact from a list, and activating a button corresponding to a pre-set number or contact. Some techniques also involve launching and/or navigating an application such as a phone application or a messaging application.

BRIEF SUMMARY

Some techniques for initiating a telephone call using electronic devices, however, are generally cumbersome and inefficient. For example, some existing techniques use a complex and time-consuming user interface, which may include multiple key presses or keystrokes. Existing techniques require more time than necessary, wasting user time and device energy. Wasting user time is particularly important in emergencies, such as when a user requires medical attention or is experiencing a life-threatening situation and needs to request help. Device energy is particularly important in battery-operated devices.

Accordingly, the present techniques provide electronic devices with faster, more efficient methods and interfaces for initiating a telephone call and sending messages. Such methods and interfaces optionally complement or replace other methods for initiating a telephone call and sending messages. Such methods and interfaces reduce the cognitive burden on a user and produce a more efficient human-machine interface. In time-sensitive situations involving a user's health, such methods and interfaces can potentially save a user's life by making it faster and easier to contact an emergency number. Such methods and interfaces also increase the ability to notify friends, family, or other contacts about a critical event. For battery-operated computing devices, such methods and interfaces also conserve power and increase the time between battery charges.

In some embodiments, a method includes, at an electronic device with a touch-sensitive display, one or more processors, and memory: detecting a first user input; in response to detecting the first user input, displaying on the touch-sensitive display a user interface screen including a first affordance and a second affordance; detecting a second user input including detecting a contact on the touch-sensitive display; in accordance with a determination that the contact corresponds to selection of the first affordance, causing the electronic device to turn off; and in accordance with a determination that the contact corresponds to selection of the second affordance, causing initiation of a telephone call to a determined number.

In some embodiments, an electronic device includes a touch-sensitive display, one or more processors, a memory, and one or more programs. The one or more programs are stored in the memory and configured to be executed by the one or more processors. The one or more programs include instructions for: detecting a first user input; in response to detecting the first user input, displaying on the touch-sensitive display a user interface screen including a first affordance and a second affordance; detecting a second user input including detecting a contact on the touch-sensitive display; in accordance with a determination that the contact corresponds to selection of the first affordance, causing the electronic device to turn off; and in accordance with a determination that the contact corresponds to selection of the second affordance, causing initiation of a telephone call to a determined number.

In some embodiments, a non-transitory computer-readable storage medium stores one or more programs. The one or more programs comprise instructions, which when executed by one or more processors of an electronic device with a touch-sensitive display, cause the device to: detect a first user input; in response to detecting the first user input, display on the touch-sensitive display a user interface screen including a first affordance and a second affordance; detect a second user input including detecting a contact on the touch-sensitive display; in accordance with a determination that the contact corresponds to selection of the first affordance, cause the electronic device to turn off; and in accordance with a determination that the contact corresponds to selection of the second affordance, cause initiation of a telephone call to a determined number.

In some embodiments, a transitory computer-readable storage medium stores one or more programs. The one or more programs comprise instructions, which when executed by one or more processors of an electronic device with a touch-sensitive display, cause the device to: detect a first user input; in response to detecting the first user input, display on the touch-sensitive display a user interface screen including a first affordance and a second affordance; detect a second user input including detecting a contact on the touch-sensitive display; in accordance with a determination that the contact corresponds to selection of the first affordance, cause the electronic device to turn off; and in accordance with a determination that the contact corresponds to selection of the second affordance, cause initiation of a telephone call to a determined number.

In some embodiments, an electronic device includes, a touch-sensitive display; means for detecting a first user input; means responsive to detecting the first user input for displaying on the touch-sensitive display a user interface screen including a first affordance and a second affordance; means for detecting a second user input including detecting a contact on the touch-sensitive display; means for, in accordance with a determination that the contact corresponds to selection of the first affordance, causing the electronic device to turn off; and means for, in accordance with a determination that the contact corresponds to selection of the second affordance, causing initiation of a telephone call to a determined number.

In some embodiments, an electronic device includes a touch-sensitive display unit configured to display a graphic user interface and receive contacts and a processing unit coupled to the display unit and the touch-sensitive surface unit. The processing unit is configured to: detect a first user input; in response to detecting the first user input, enable display, on the touch-sensitive display, of a user interface screen including a first affordance and a second affordance; detect a second user input including detecting a contact on the touch-sensitive display; in accordance with a determination that the contact corresponds to selection of the first affordance, cause the electronic device to turn off; and in accordance with a determination that the contact corresponds to selection of the second affordance, cause initiation of a telephone call to a determined number.

In some embodiments, a method includes, at an electronic device with a touch-sensitive display, one or more processors, and memory: detecting a first user input; in response to detecting the first user input, initiating a countdown, where initiating the countdown includes displaying a visual indication of the countdown on the display; determining that the countdown has completed; and in response to determining that the countdown has completed, causing initiation of a telephone call to a determined number.

In some embodiments, an electronic device includes a touch-sensitive display, one or more processors, a memory, and one or more programs. The one or more programs are stored in the memory and configured to be executed by the one or more processors. The one or more programs include instructions for: detecting a first user input; in response to detecting the first user input, initiating a countdown, where initiating the countdown includes displaying a visual indication of the countdown on the display; determining that the countdown has completed; and in response to determining that the countdown has completed, causing initiation of a telephone call to a determined number.

In some embodiments, a non-transitory computer-readable storage medium stores one or more programs. The one or more programs comprising instructions, which when executed by one or more processors of an electronic device with a touch-sensitive display, cause the device to: detect a first user input; in response to detecting the first user input, initiate a countdown, where initiating the countdown includes displaying a visual indication of the countdown on the display; determine that the countdown has completed; and in response to determining that the countdown has completed, cause initiation of a telephone call to a determined number.

In some embodiments, a transitory computer-readable storage medium stores one or more programs. The one or more programs comprise instructions, which when executed by one or more processors of an electronic device with a touch-sensitive display, cause the device to: detect a first user input; in response to detecting the first user input, initiate a countdown, where initiating the countdown includes displaying a visual indication of the countdown on the display; determine that the countdown has completed; and in response to determining that the countdown has completed, cause initiation of a telephone call to a determined number.

In some embodiments, an electronic device includes: a touch-sensitive display; means for detecting a first user input; means responsive to detecting the first user input for initiating a countdown, where initiating the countdown includes displaying a visual indication of the countdown on the display; means for determining that the countdown has completed; and means responsive to determining that the countdown has completed for causing initiation of a telephone call to a determined number.

In some embodiments, an electronic device includes a touch-sensitive display unit configured to display a graphic user interface and receive contacts and a processing unit coupled to the display unit and the touch-sensitive surface unit. The processing unit is configured to: detect a first user input; in response to detecting the first user input, initiate a countdown, where initiating the countdown includes enabling display of a visual indication of the countdown on the display; determine that the countdown has completed; and in response to determining that the countdown has completed, cause initiation of a telephone call to a determined number.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for initiating a telephone call and sending messages, thereby increasing the effectiveness, efficiency, and user satisfaction with such devices. Such methods and interfaces may complement or replace other methods for initiating a telephone call and sending messages.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
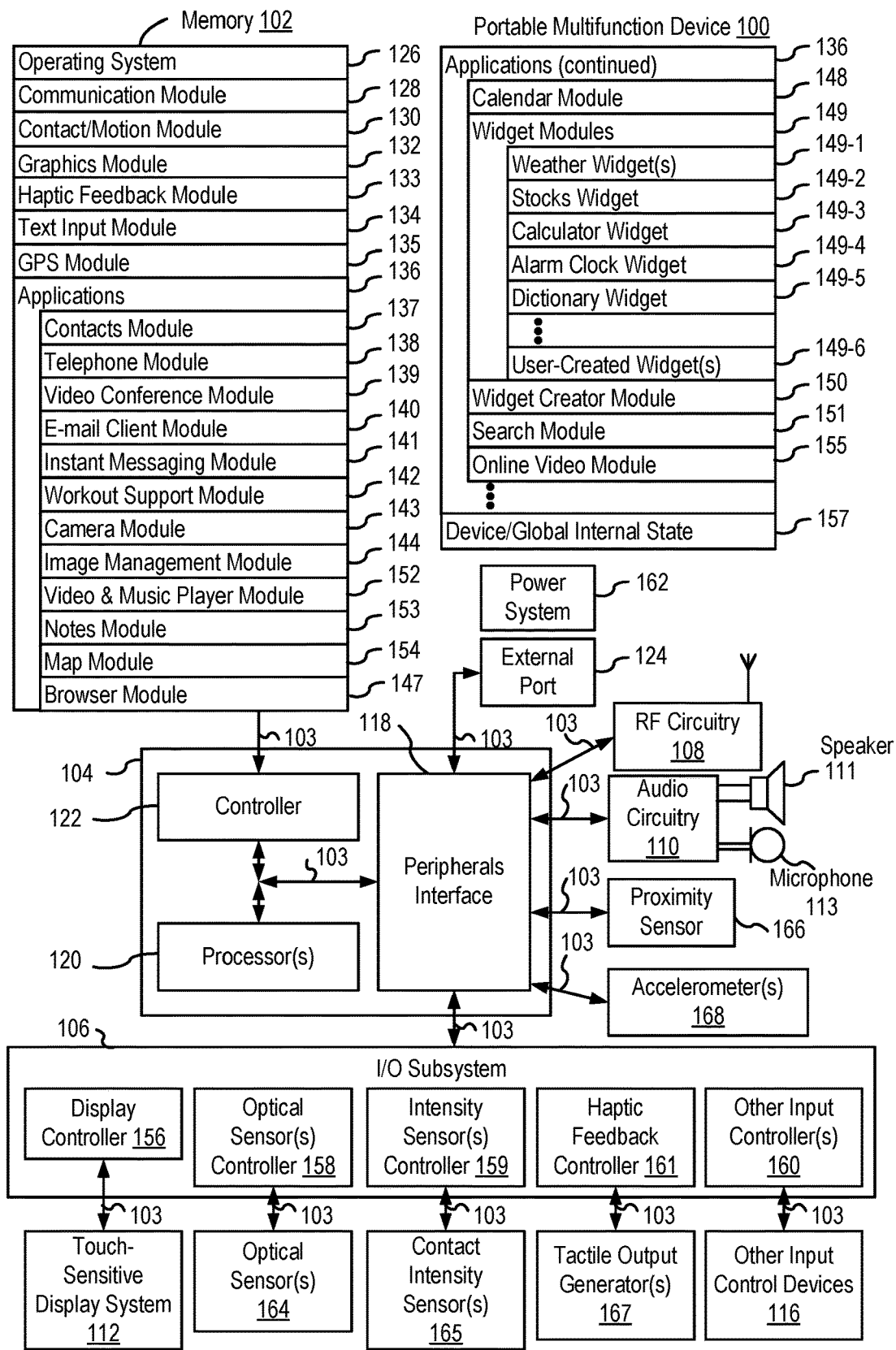
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for initiating a telephone call and sending messages. In one example, an electronic device provides functionality to initiate a telephone call to a determined number (e.g., 911) and send a message to a designated set of contacts in response to a single input. The number is optionally an emergency number, such as 911, and the message optionally indicates that the user of the electronic device has been involved in an emergency. Such techniques can reduce the cognitive burden on a user who desires to initiate a telephone call and send messages, thereby improving the user's ability to obtain assistance and notify friends and family in an emergency.

Below, FIGS. 1A-1B, 2, 3, 4A-4B, and 5A-5H provide a description of exemplary devices for performing the techniques for initiating a telephone call. FIGS. 6A-6X illustrate exemplary user interfaces for initiating a telephone call. FIGS. 7A-7C and 9A-9B are flow diagrams illustrating methods of initiating a telephone call in accordance with some embodiments. The user interfaces in FIGS. 6A-6X are used to illustrate the processes described below, including the processes in FIGS. 7A-7C and 9A-9B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system)

receiver (not shown) for obtaining information concerning the location and orientation (e.g., portrait or landscape) of device 100.

Figure 3:
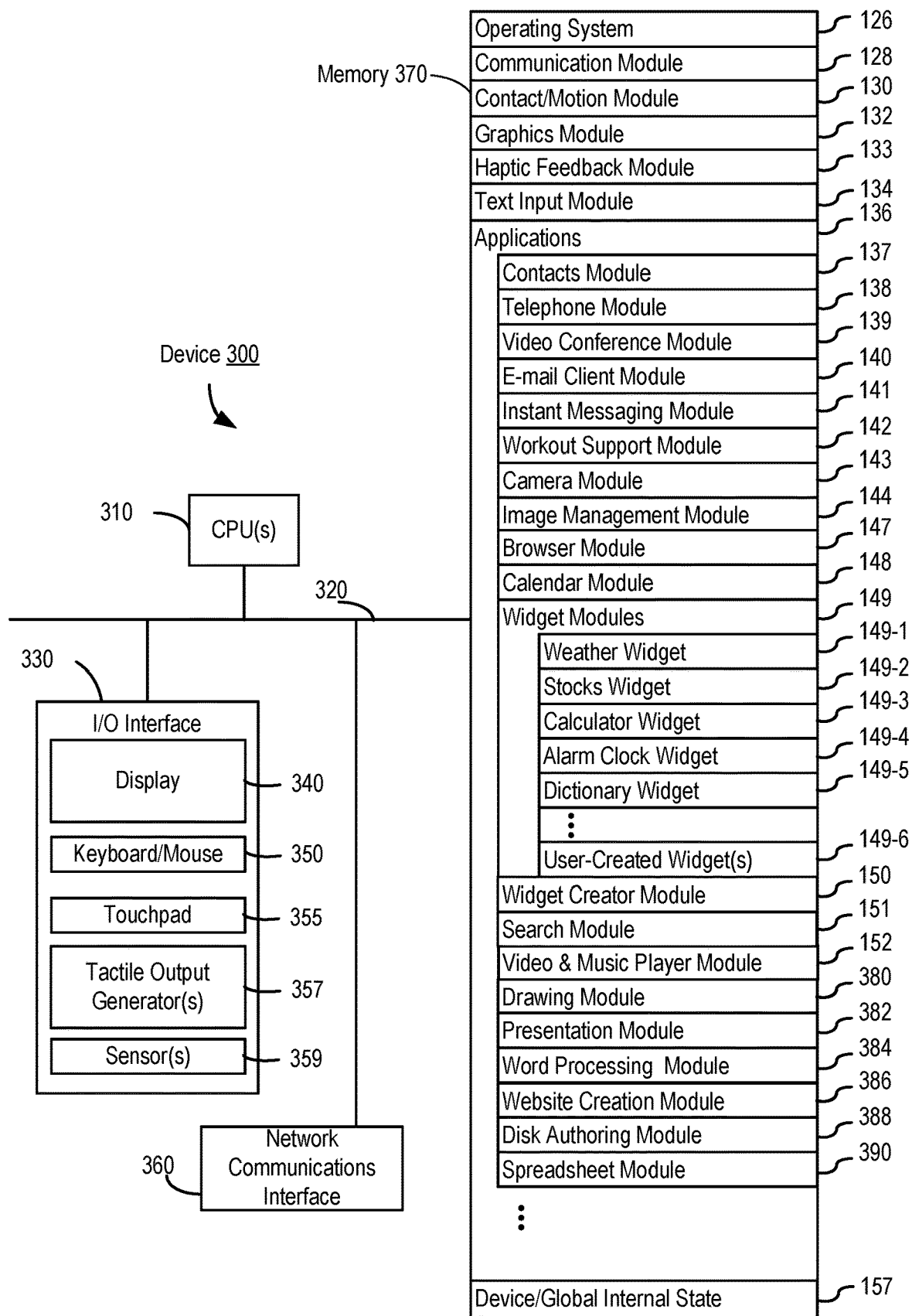
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
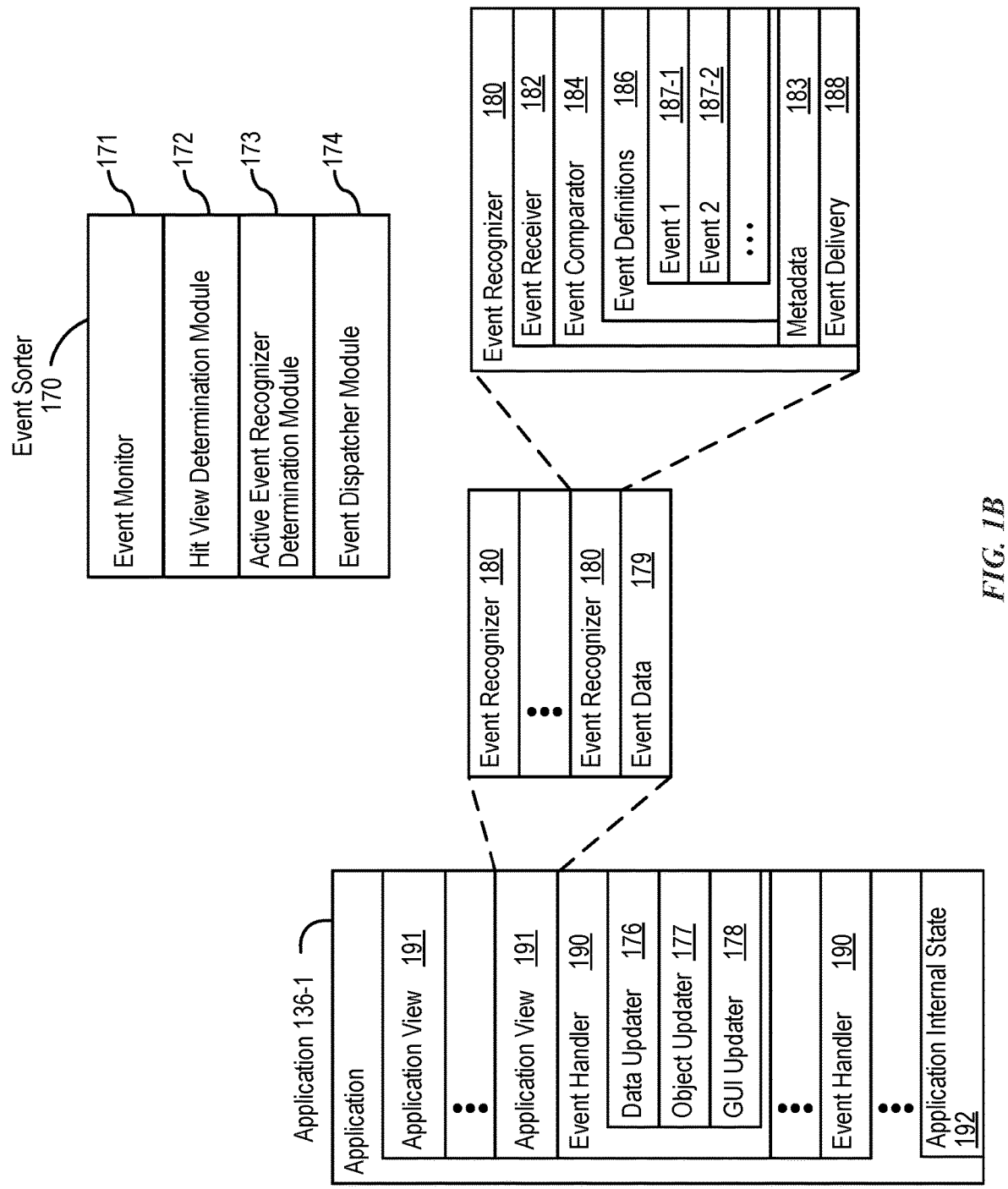
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
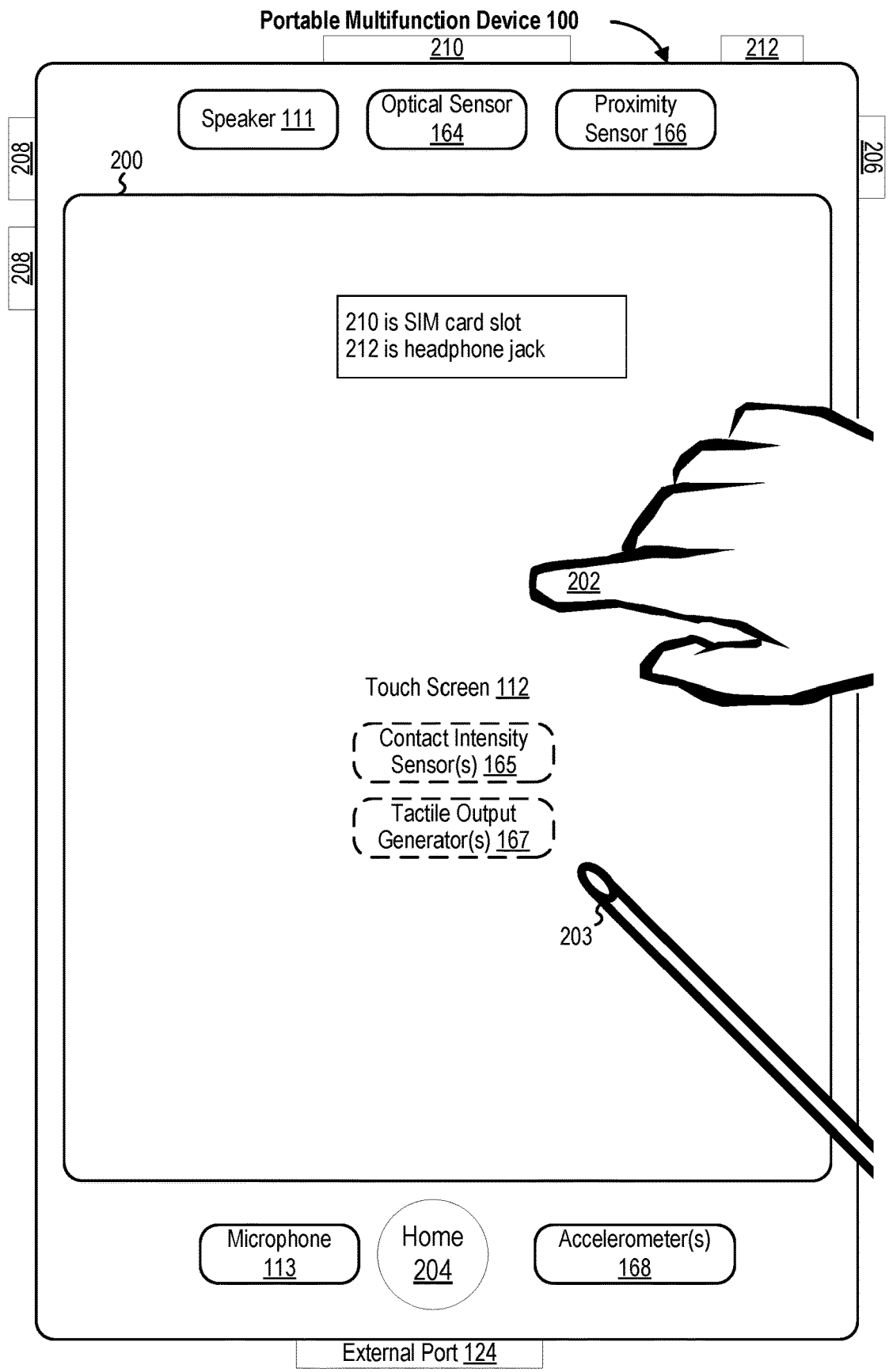
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
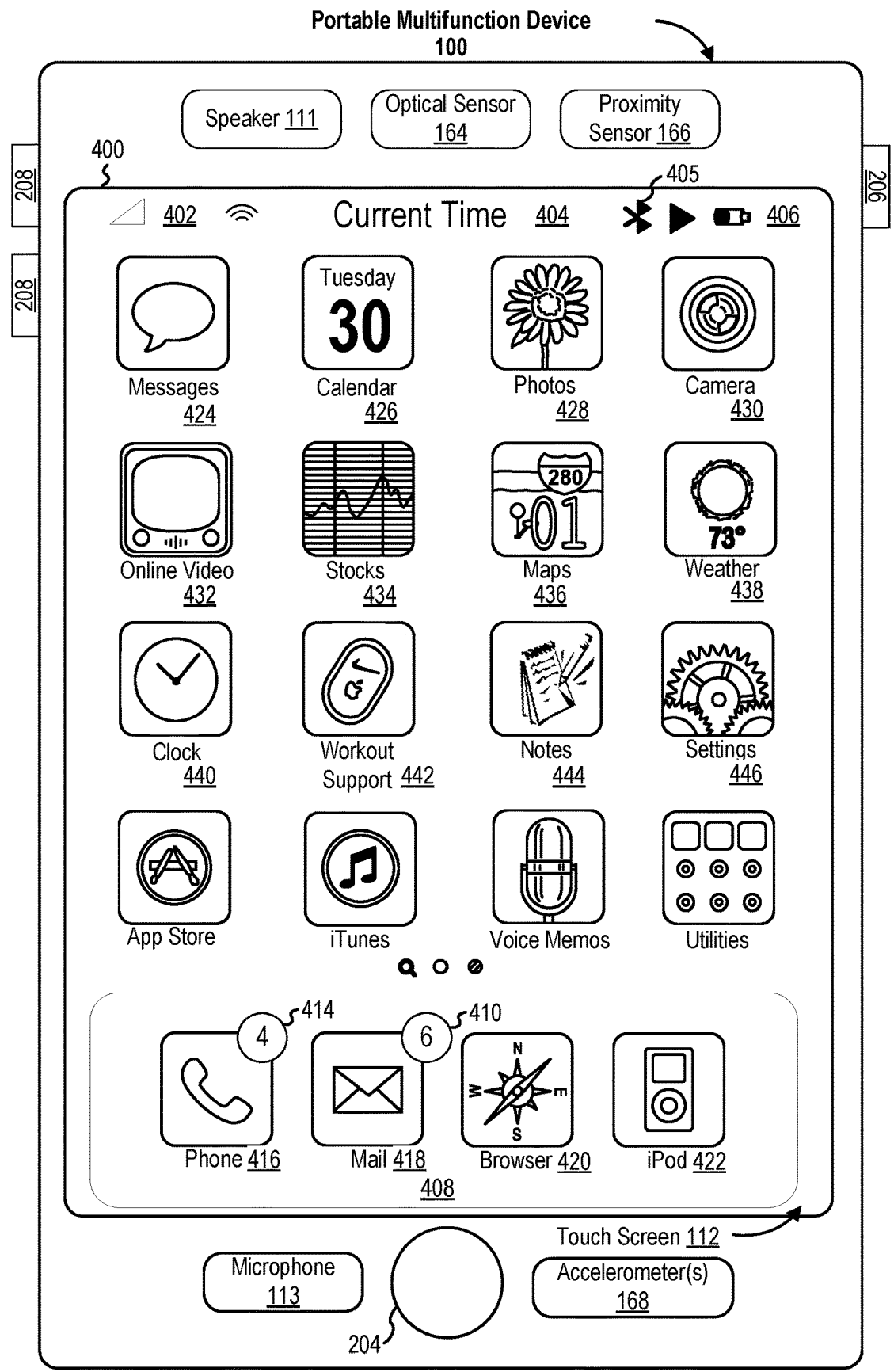
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
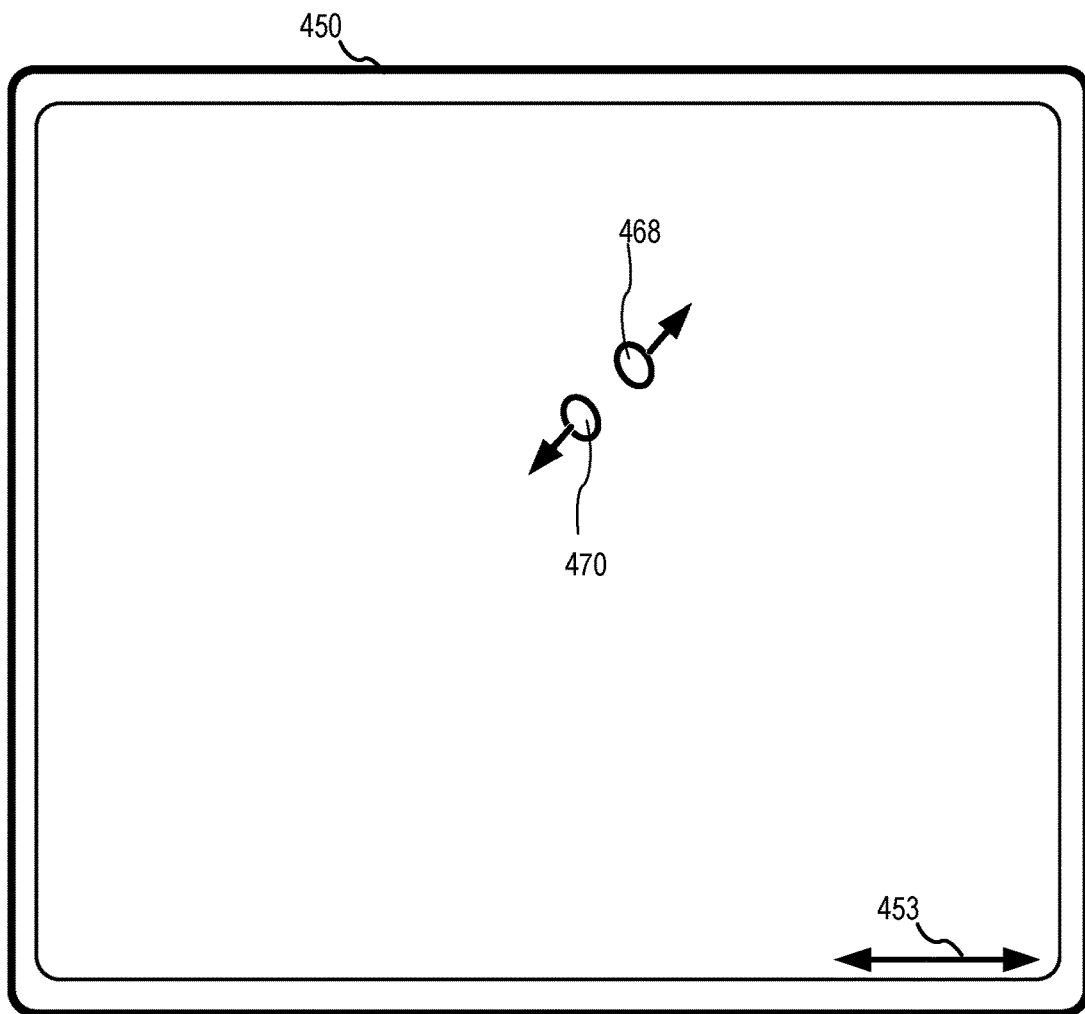
FIG. 4B illustrates an exemplary user interface for a multifunction device with a touch-sensitive surface that is separate from the display in accordance with some embodiments.
Figure 4B:
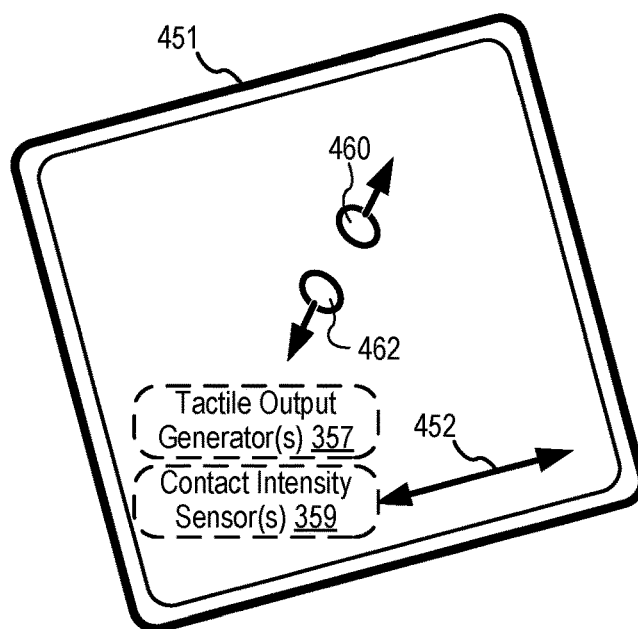

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
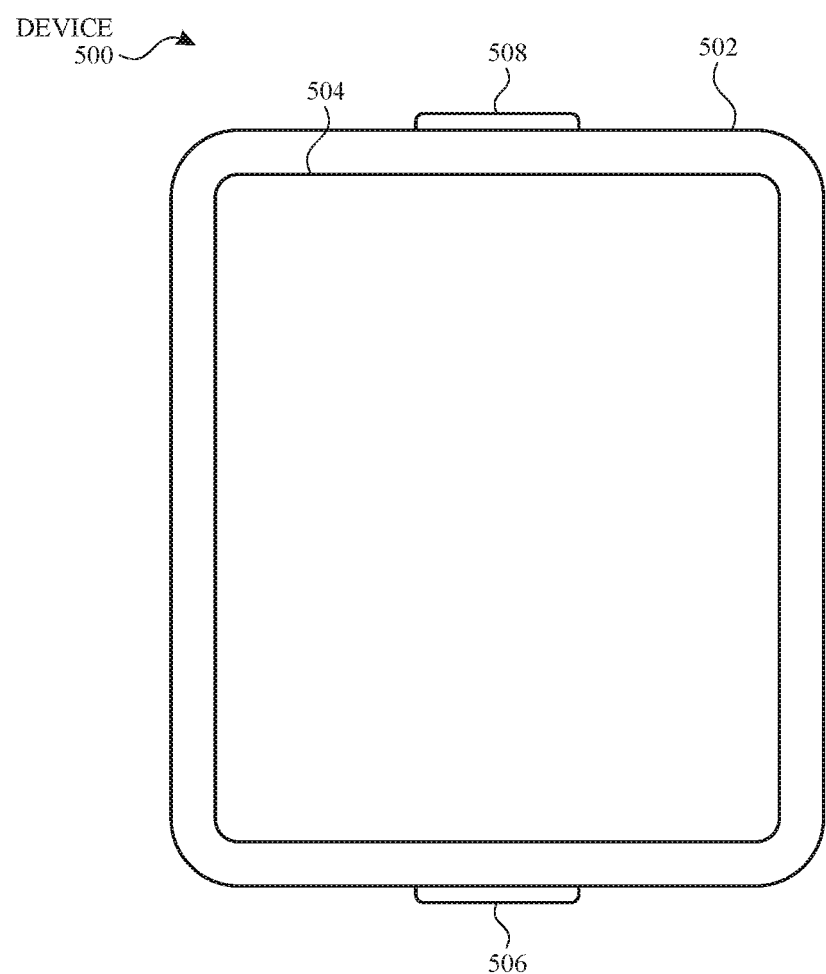
FIG. 5A illustrates a personal electronic device in accordance with some embodiments.
Figure 6A:
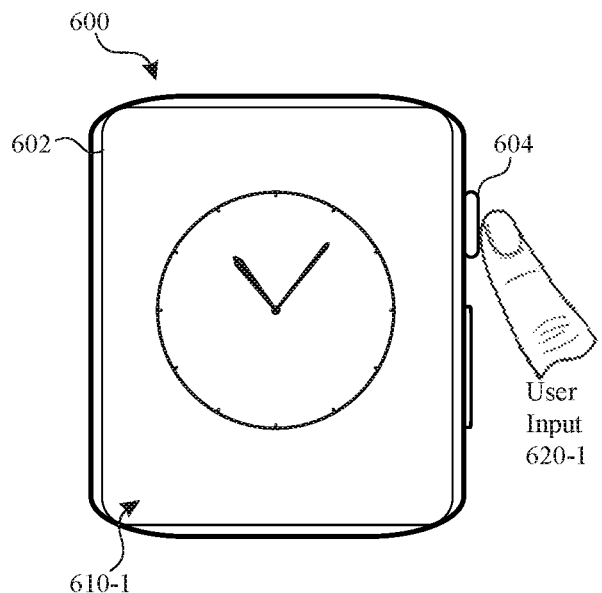
FIGS. 6A-6X illustrate exemplary user interfaces in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
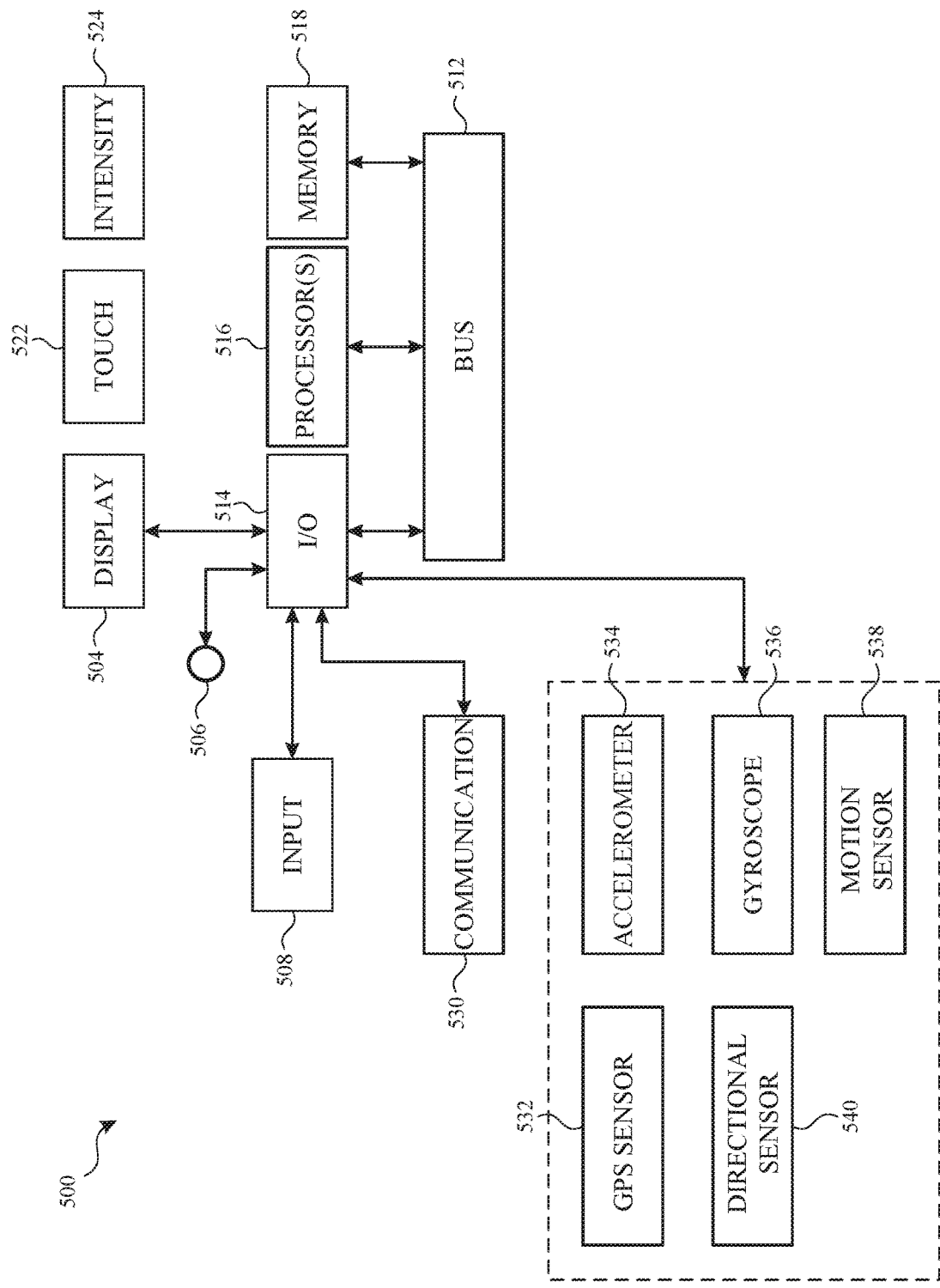
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7C and 9A-9B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
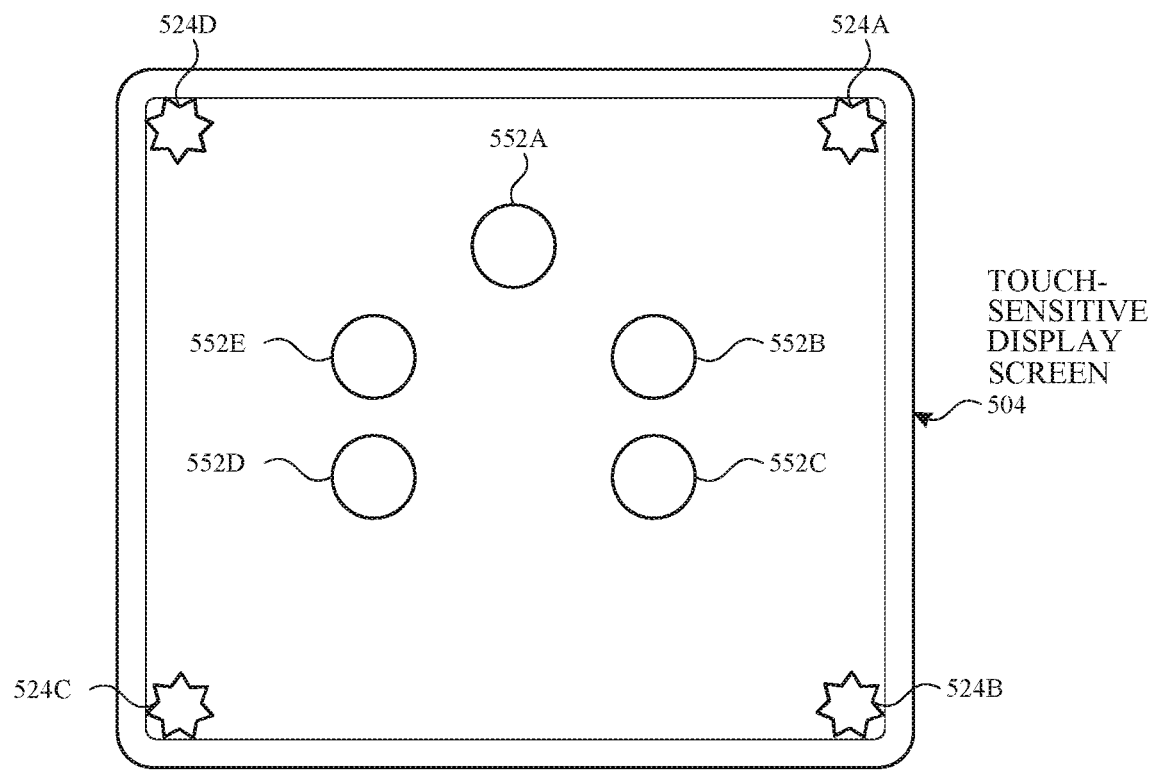
FIGS. 5C-5D illustrate exemplary components of a personal electronic device having a touch-sensitive display and intensity sensors in accordance with some embodiments.
Figure 5C:
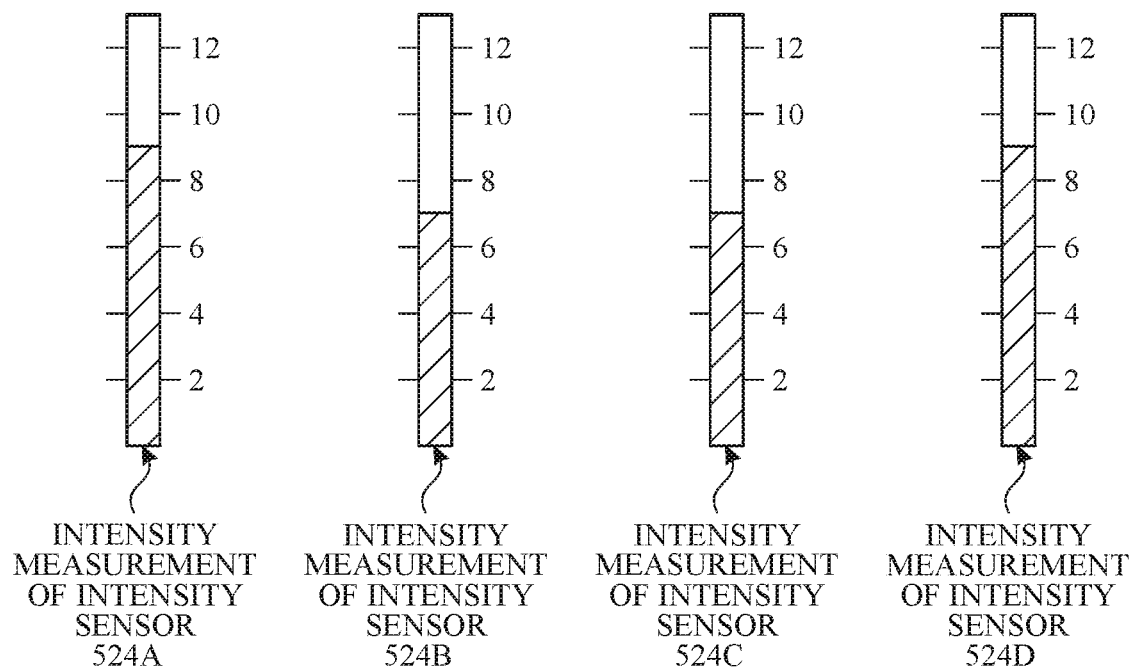
Figure 5D:
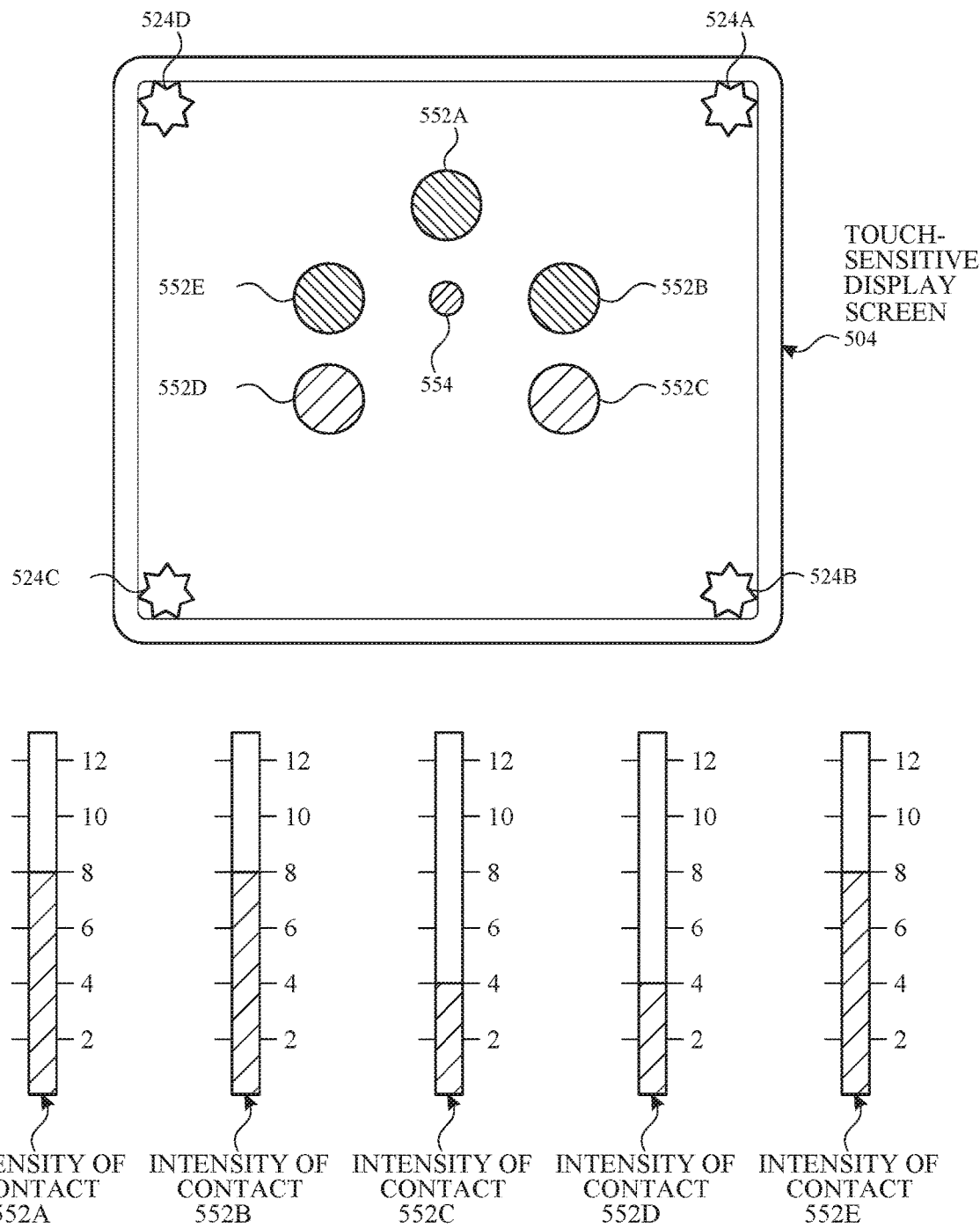

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $I_j = A \cdot (D_j / \Sigma D_i)$, where $D_j$ is the distance of the respective contact j to the center of force, and $D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
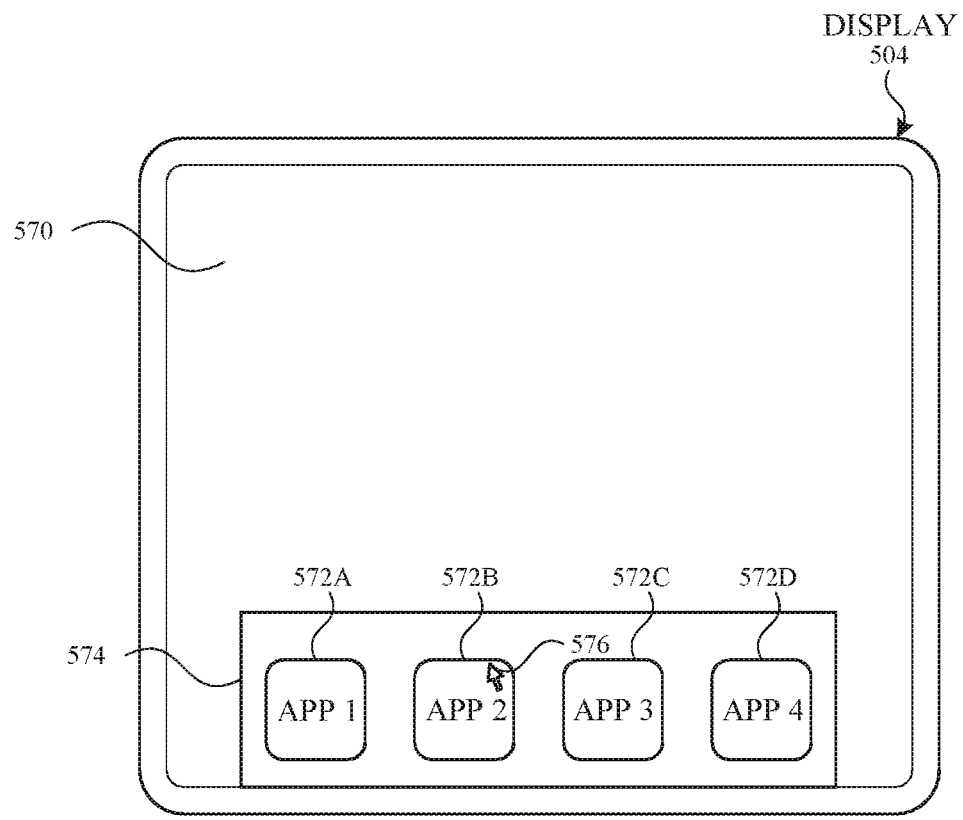
FIGS. 5E-5H illustrate exemplary components and user interfaces of a personal electronic device in accordance with some embodiments.
Figure 5F:
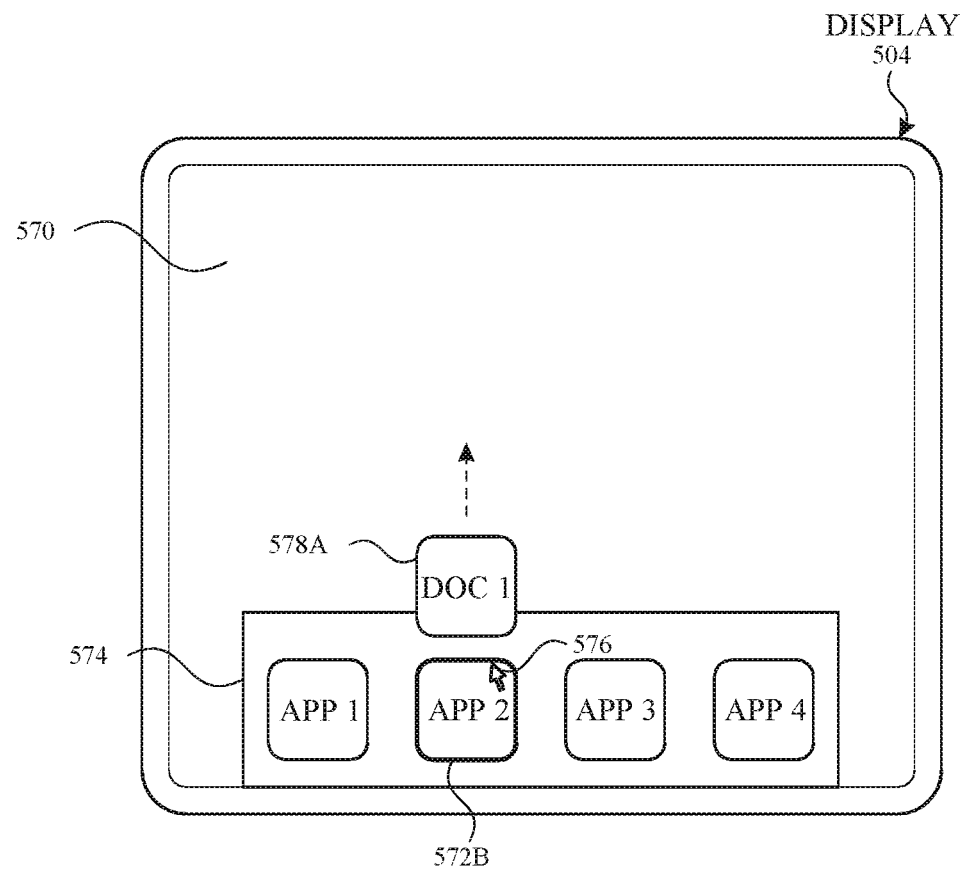
Figure 5F:
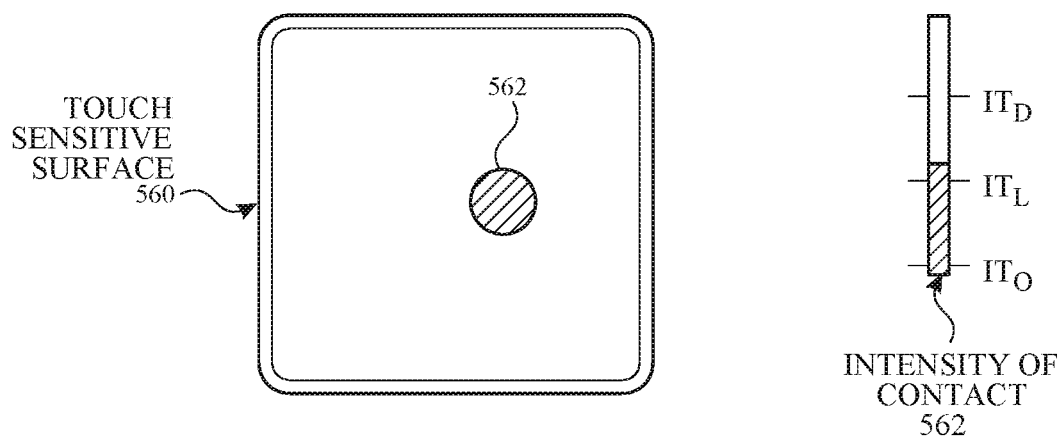
Figure 5G:
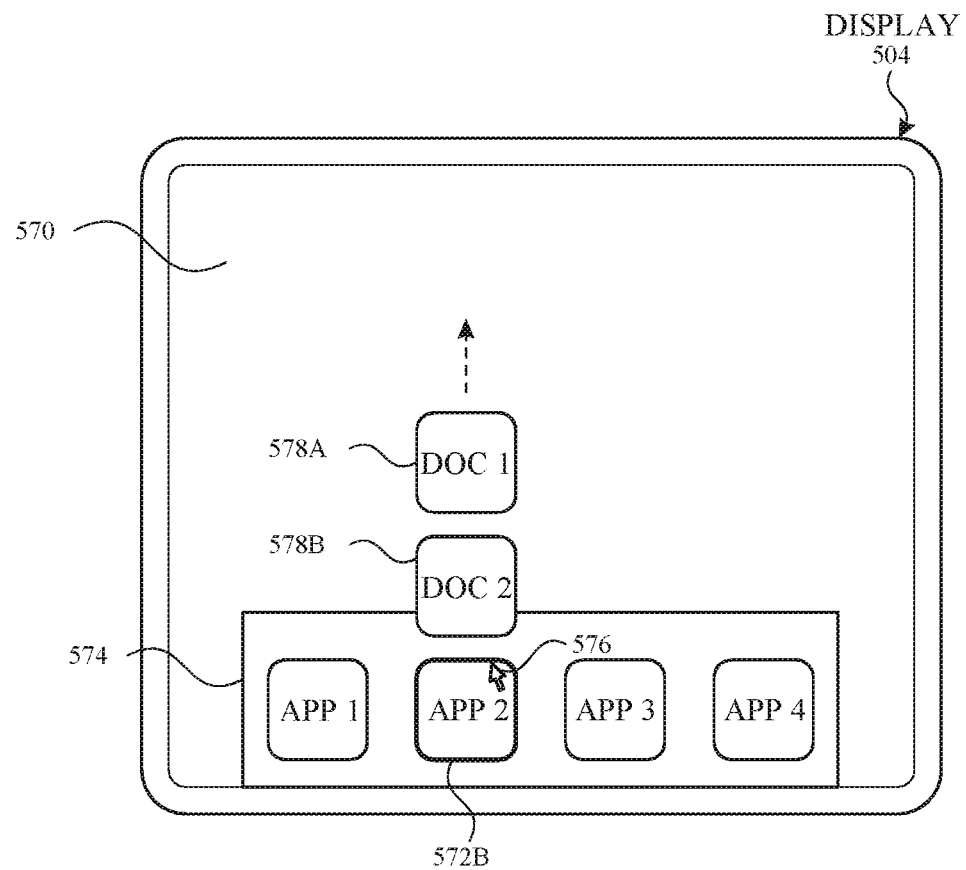
Figure 5G:
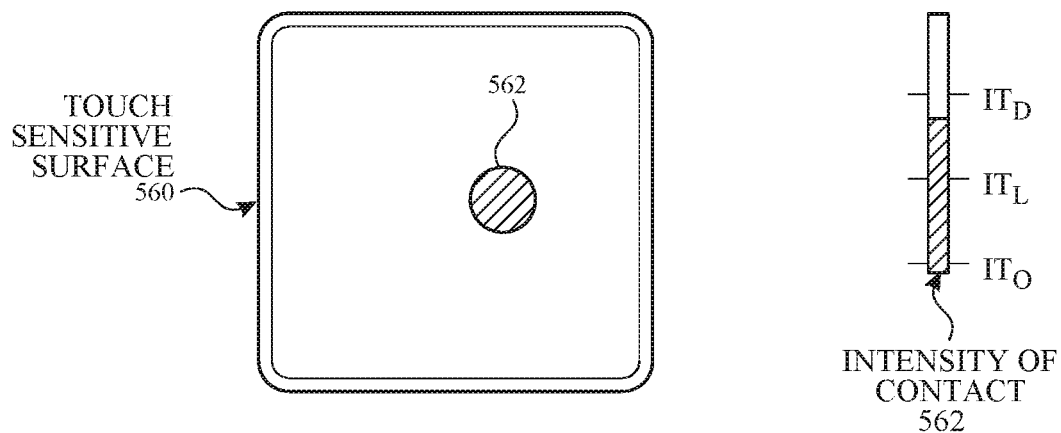
Figure 5H:
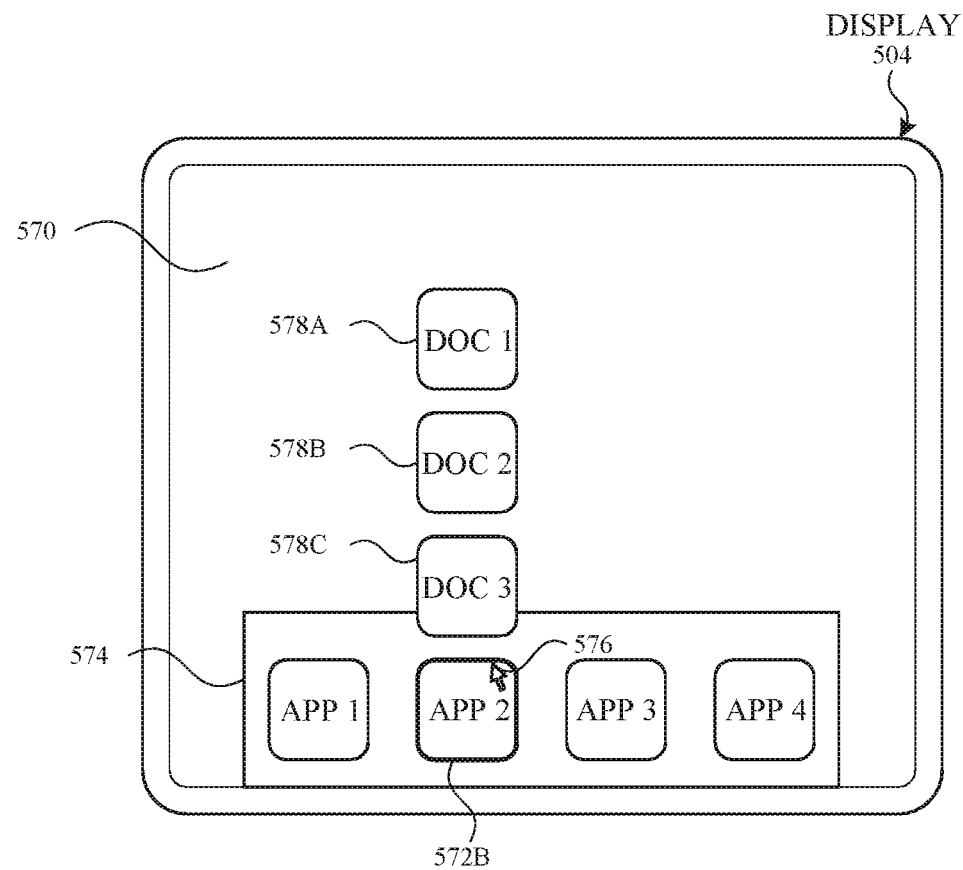
Figure 5H:
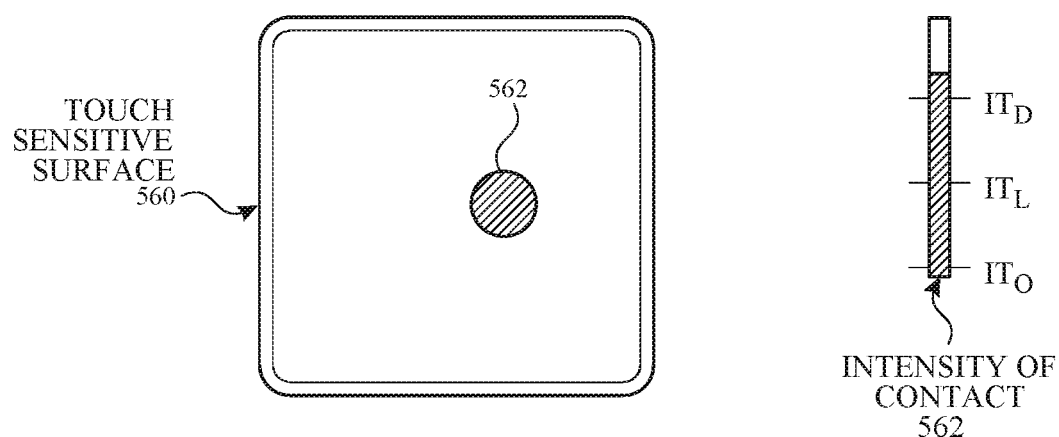

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6X illustrate exemplary user interfaces for initiating a telephone call and sending messages, in accordance with some embodiments. The user interfaces in these figures are used to illustrate the processes described below, including the processes in FIGS. 7A-7C and 9A-9B.

FIG. 6A illustrates electronic device 600 with a touch-sensitive display 602. In some embodiments, device 600 includes some or all of the features of devices 100, 300, and 500, discussed above. In FIG. 6A, device 600 displays a user interface screen 610-1 on touch-sensitive display 602. In the illustrated example, device 600 is in a watch mode and user interface screen 610-1 is a watch face with an indication of time. In some embodiments, user interface screen 610-1 can be a user interface of an application running on device 600, a home screen with affordances for launching applications, or other user interface that device 600 is capable of displaying.

Figure 6B:
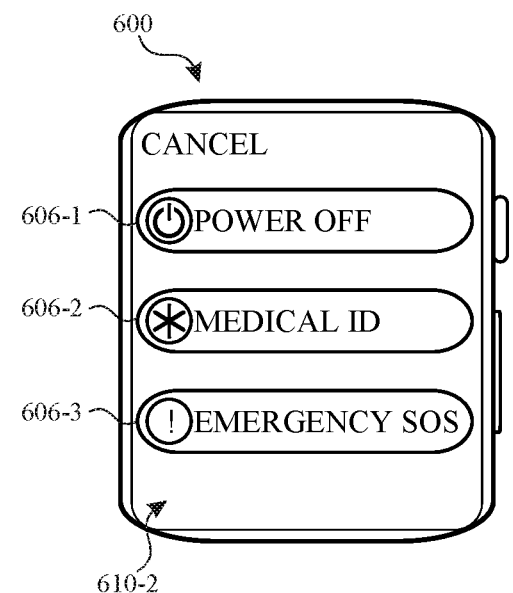

Device 600 receives user input 620-1. In the embodiment illustrated in FIG. 6A, user input 620-1 is a press of physical button 604 on device 600. In some embodiments, device 600 receives user input in the form of a touch gesture on the touch-sensitive display 602. Device 600 detects user input 620-1, and in response to detecting user input 620-1, displays a user interface screen 610-2 on the touch-sensitive display 602, as shown in FIG. 6B. User interface screen 610-2 replaces screen 610-1 and includes affordance 606-1 labeled "Power Off", affordance 606-2 labeled "Medical I.D.", and affordance 606-3 labeled "Emergency S.O.S.".

In some embodiments, device 600 determines a duration of user input 620-1 and whether the duration exceeds a first predetermined amount of time. If so, then device 600 displays user interface screen 610-2. That is, in some embodiments, user interface screen 610-2 is displayed in accordance with a determination that the duration of user input 620-1 exceeds the first predetermined amount of time.

In the illustrated embodiment, affordances 606-1, 606-2, and 606-3 can be selected by a swipe gesture at a location on touch-sensitive display 602 corresponding to the location of the respective affordance. Affordance 606-1, for example, is selected by initiating contact at or near the left side of affordance 606-1 in FIG. 6B and maintaining the contact while moving the contact substantially horizontally to the right side of affordance 606-1. More generally, selection of affordance 606-1 includes movement of the contact from a first predetermined location on the touch-sensitive display 602 to a second location on the touch-sensitive display 602. In some embodiments, the icon on the left side of affordance 606-1 is moved on touch-sensitive display 602 in accordance with the contact. Affordance 606-2 and affordance 606-3 can be selected in an analogous manner as described above for affordance 606-1. In some embodiments, affordances 606-1, 606-2, and 606-3 can be selected by another type of user input, such as a tap on a location of the respective affordance or use of rotatable input mechanism (e.g., physical button 604 may be rotatable and depressible to allow a user to move focus to a desired affordance and select the affordance by pressing).

Figure 6C:
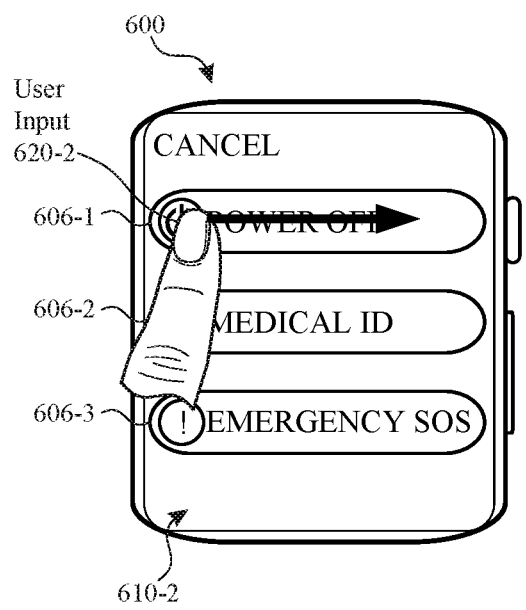

While displaying user interface screen 610-2, device 600 detects another user input 620-2, as shown in FIG. 6C, which includes a contact on the touch-sensitive display 602. In the embodiment illustrated in FIG. 6C, device 600 determines that the contact of user input 620-2 corresponds to selection of the affordance 606-1. In response to determining that the contact of user input 620-2 corresponds to selection of the affordance 606-1, device 600 causes itself to turn off.

Figure 6D:
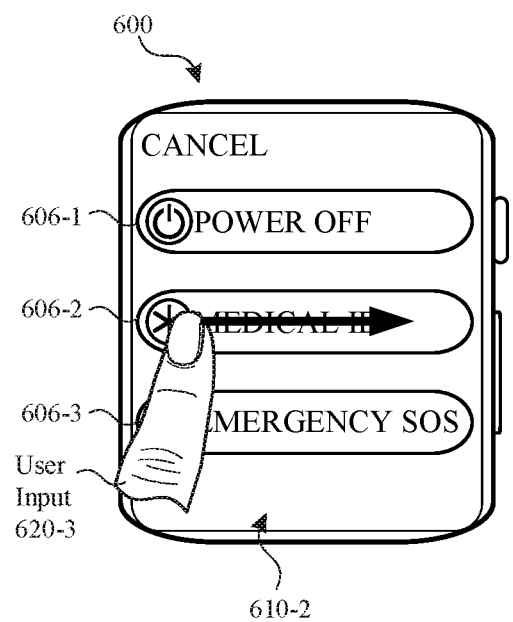

FIG. 6D also illustrates device 600 displaying user interface screen 610-2. In FIG. 6D, however, the user input 620-3 detected by device 600 includes a contact on the touch-sensitive display 602 at the location of affordance 606-2. In the embodiment illustrated in FIG. 6D, device 600 determines that the contact of user input 620-3 corresponds to selection of the affordance 606-2. In response to determining that the contact of user input 620-3 corresponds to selection of the affordance 606-2, device 600 displays medical information, as described in greater detail below with reference to FIG. 6T.

Figure 6E:
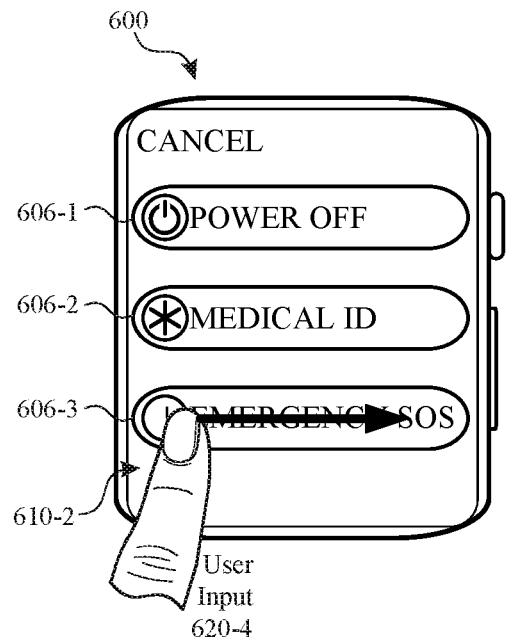

FIG. 6E also illustrates device 600 displaying user interface screen 610-2. In FIG. 6E, however, the user input 620-4 detected by device 600 includes a contact on the touch-sensitive display 602 at the location of affordance 606-3. In the embodiment illustrated in FIG. 6E, device 600 determines that the contact of user input 620-4 corresponds to selection of the affordance 606-3. In response to determining that the contact of user input 620-4 corresponds to selection of the affordance 606-3, device 600 causes initiation of a telephone call to a determined number.

In some embodiments, the number is predetermined, e.g., by previous user input or a factory preset. In some embodiments, the determined number is an emergency number (e.g., 911, Police, Fire Dept., Hospital, etc.). Optionally, the number is determined based on location. Since different countries or geographic regions may have different emergency numbers, it may be advantageous to determine the location of device 600 and determine the emergency number based on the location. In some embodiments, the number is determined, e.g., periodically, in response to a change in location, or at the time the call is caused to be initiated (e.g., by a remote server connected to device 600).

In some embodiments, the call is initiated on device 600. In some embodiments, the call is initiated on an external device in communication with device 600. For example, in some embodiments, device 600 can operate in a paired relationship with a cell phone, smartphone, or other external device capable of initiating a call. Being in a paired relationship with the external device allows device 600 to communicate (e.g., via NFC or Bluetooth protocol) with the external device to send instructions to the external device to initiate the call to the determined number.

In some embodiments, device 600 causes itself, or an external device that initiates the call, to prepare to make the call to the determined number before determining that affordance 606-3 has been selected. Preparing the call may reduce the delay in initiating the call once affordance 606-3 is selected or one of the other techniques for initiating the telephone call described in the present disclosure is performed. In some embodiment, device 600 causes preparation of the telephone call to the determined number in response to user input 620-1 in FIG. 6A. In some embodiments, preparing the call includes determining the number to be called and setting device 600 (or an external device that is to initiate the call) to prepare the call.

Figure 6F:
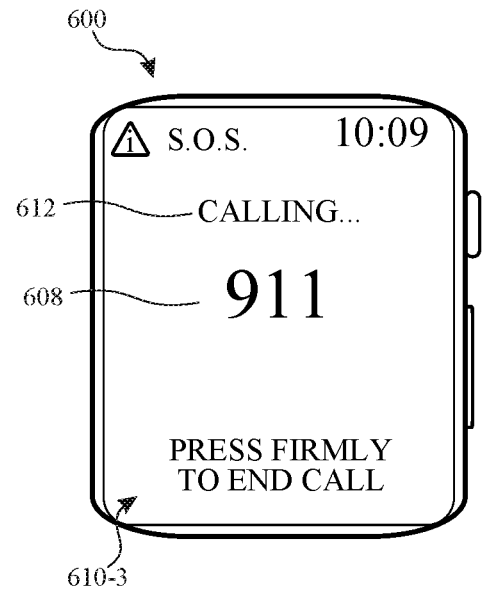

In the illustrated embodiment, after causing the call to be initiated, device 600 replaces user interface screen 610-2 with user interface screen 610-3 shown in FIG. 6F. User interface screen 610-3 includes an indication 608 of the number being called (911) and an indication 612 of the status of the call ("Calling").

Figure 6G:
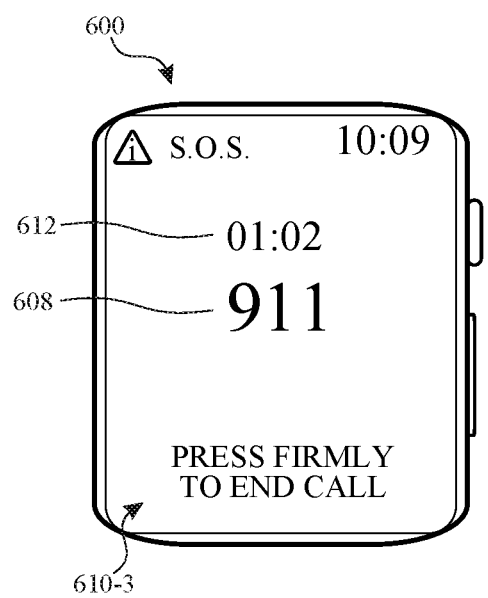
Figure 6H:
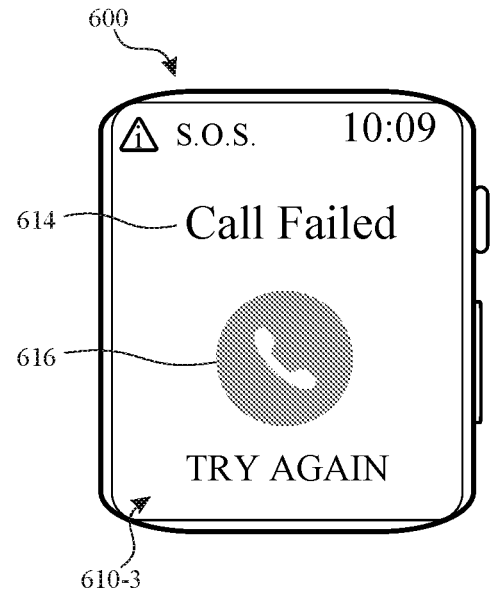

In the illustrated embodiment, the device receives data that indicates whether the call was successfully established. If a connection with the determined number is established, device 600 changes the indication 612 of the status of the call to indicate the current duration of the call (e.g., "01: 02"), as shown in FIG. 6G. If not, device 600 displays an indication 614 that the call has failed and provide an affordance 616 that can be selected to try again to initiate the call (e.g., a "Try Again" button), as shown in FIG. 6H.

Device 600 optionally provides techniques for ending the call after the call has been initiated (e.g., in response to selection of affordance 606-3). FIG. 6I illustrates device 600 displaying user interface screen 610-3 as shown in FIG. 6G. User interface screen 610-3 includes instructions 618 for ending the call. In FIG. 6I, instructions 618 instruct the user to "Press Firmly to End Call." While displaying user interface screen 610-3, device 600 detects a user input that includes a contact 620-5 on touch-sensitive display 602. Device 600 determines whether a characteristic intensity of contact 620-5 exceeds a threshold intensity. In accordance with a determination that the characteristic intensity of contact 620-5 exceeds the threshold intensity, device 600 displays user interface screen 610-4 shown in FIG. 6J. In some embodiments, user interface screen 610-4 is also displayed by device 600 in response to a user input that covers touch-sensitive display 602 for a predetermined amount of time.

User interface screen 610-4 presents a query whether to end the call (e.g., "End Call?") and includes affordance 622 labeled "No" and affordance 624 labeled "Yes". In the illustrated embodiment, device 600 causes the call to be continued in response to selection of affordance 622 and causes the call to end in response to selection of affordance 624. For embodiments in which the actual communication of the telephone call is made by a device (e.g., a cell phone) external to device 600, causing the call to end includes sending instructions to the external device (e.g., via NFC, Bluetooth communication protocol, etc.) to end the call.

In response to selection of affordance 624 "Yes", in addition to causing the call to end, device 600 also indicates that the call has ended by displaying user interface screen 610-5 with the text "Call Ended", as shown in FIG. 6K. In some embodiments, device 600 presents a query whether to continue the call, and selecting "No" causes device 600 to end the call while selecting "Yes" causes device 600 to continue the call.

Although the embodiment described with respect to FIG. 6J displays user interface screen 610-4, which requires the user to confirm that the call is to be ended, in some embodiments, device 600 causes the call to end directly in response to contact 620-5, without requiring confirmation or displaying user interface screens 610-4 and/or 610-5. In some embodiments, device 600 causes the call to end directly in response to a user input that covers touch-sensitive display 602 for a predetermined amount of time, without requiring confirmation or displaying user interface screens 610-4 and/or 610-5. The call can is also ended in response to a lost connection or the party at the determined number hanging up or otherwise ending the call.

As mentioned above, exemplary device 600 provides additional techniques for initiating a telephone call to a determined number. In some embodiments, device 600 provides techniques for initiating a telephone call to a determined number with a single input. Referring again to FIG. 6A, device 600 determines whether the duration of user input 620-1 exceeds a second predetermined amount of time. In accordance with a determination that the duration of user input 620-1 exceeds the second predetermined amount of time, device 600 initiates a countdown, at the end of which the telephone call to the determined number is to be initiated. In some embodiments, the countdown has a predetermined duration (e.g., three seconds).

FIGS. 6L-6N illustrate an exemplary user interface screen 610-6 displayed by device 600 in accordance with the determination that the duration of user input 620-1 exceeds the second predetermined amount of time. In the illustrated embodiment, initiating the countdown includes displaying a visual indication 606-4 of the countdown. Visual indication 606-4 includes a progress bar 626 that fills in as the countdown progresses. Visual indication 606-4 also includes a numeric indication 628, the value of which decreases as the countdown progresses. The numeric indication 628 and progress bar 626 each provides an indication of the status of the countdown. Optionally, device 600 provides a haptic output during the countdown (e.g., while displaying the visual indication of the countdown).

When the countdown has completed (e.g., the predetermined duration has passed since initiation of the countdown, without the countdown being interrupted, canceled, overridden, bypassed, etc.), device 600 determines that the countdown has completed. In response to determining that the countdown has completed, device 600 causes initiation of the telephone call to the determined number. Since the call is automatically initiated upon completion of the countdown, only a single user input (e.g., an extended press of physical button 604) is required to initiate the call.

In some embodiments, the countdown can be interrupted, canceled, overridden, bypassed, etc. by user input. In the illustrated embodiment, device 600 cancels the countdown (which optionally also causes the telephone call not to be initiated) in response to user input (e.g., a tap) on affordance 630 in FIGS. 6L-6N labeled "Cancel". In some embodiments, a contact on touch-sensitive display 602 with a characteristic intensity that exceeds a threshold intensity causes device 600 to cancel the countdown or display a prompt to allow the user to confirm whether or not to cancel the countdown (e.g., an affordance to confirm cancellation of the countdown or further instructions for ending the countdown). In some embodiments, device 600 displays user interface screen 610-2 (FIG. 6B) (e.g., device 600 replaces user interface screen 610-6 with user interface screen 610-2) when or after the countdown is canceled.

In some embodiments, visual indication 606-4 includes an affordance that when selected causes device 600 to cause initiation of the telephone call. For example, a user could bypass the countdown and cause a telephone call to the determined number to be initiated by performing a left to right swipe gesture on visual indication 606-4 before the countdown has expired.

In some embodiments, device 600 bypasses the countdown in response to continuation of the user input 620-1. In some embodiments, bypassing the countdown involves beginning the countdown, but initiating the call before completion of the countdown. In some embodiments, bypassing the countdown involves forgoing the countdown process, altogether. For example, in some embodiments, device 600 determines whether the duration of the user input 620-1 exceeds a third predetermined amount of time that is greater than the second predetermined amount of time discussed above for initiating the countdown. In accordance with a determination that the duration of the user input 620-1 exceeds the third predetermined amount of time, device 600 causes initiation of the telephone call to the determined number. If the third predetermined amount of time is less than the combined duration of the second predetermined amount of time and the duration of the countdown, then this feature may allow a user to initiate a call with a single input, and to do so more quickly than if the countdown is permitted to complete.

User interface screen 610-6 also displays affordance 606-1 and affordance 606-2. However, affordance 606-1 and affordance 606-2 are de-emphasized (e.g., shown in reduced contrast or greyed out) and are optionally deactivated (e.g., they cannot be selected to turn off device 600 or display medical information, respectively). In user interface screen 910-6, visual indication 606-4 is displayed in the same location on touch-sensitive display 602 as affordance 606-3 on user interface screen 610-2 (see, e.g., FIG. 6B). For some embodiments in which user interface screen 610-2 is displayed prior to user interface screen 610-6, device 600 replaces affordance 606-3 or converts affordance 606-3 into visual indication 606-4.

In some embodiments, the second predetermined amount of time for initiating the countdown is greater than the first predetermined amount of time described above for displaying user interface screen 610-2. In some embodiments, in response to user input 620-1, device 600 displays user interface screen 610-2 in FIG. 6B once the first predetermined amount of time is reached, and then initiates the countdown and replaces user interface screen 610-2 with user interface screen 610-6 in FIG. 6L once the second predetermined amount of time is reached.

In some embodiments, device 600 does not display user interface screen 610-2 in FIG. 6B, if at all, until it is determined that user input 620-1 has ended. In this case, if the duration of user input 620-1 exceeds the second predetermined amount of time, device 600 initiates the countdown and displays user interface screen 610-6 without displaying user interface screen 610-2. If user input 620-1 ends and the duration of user input 620-1 does not exceed the second predetermined amount of time, device 600 displays user interface screen 610-2 without initiating the countdown (e.g., if the duration of user input 620-1 exceeded the first predetermined amount of time).

In some embodiments, device 600 provides techniques for sending a message to a predetermined set of one or more contacts. In some embodiments, the message includes data indicating a user associated with device 600 and a location of device 600. In this way, device 600 can provide information that may allow someone (e.g., a friend, family member, or personal contact) to find the user of device 600 and possibly provide assistance to the user in an emergency.

Figures 6O, 6P:
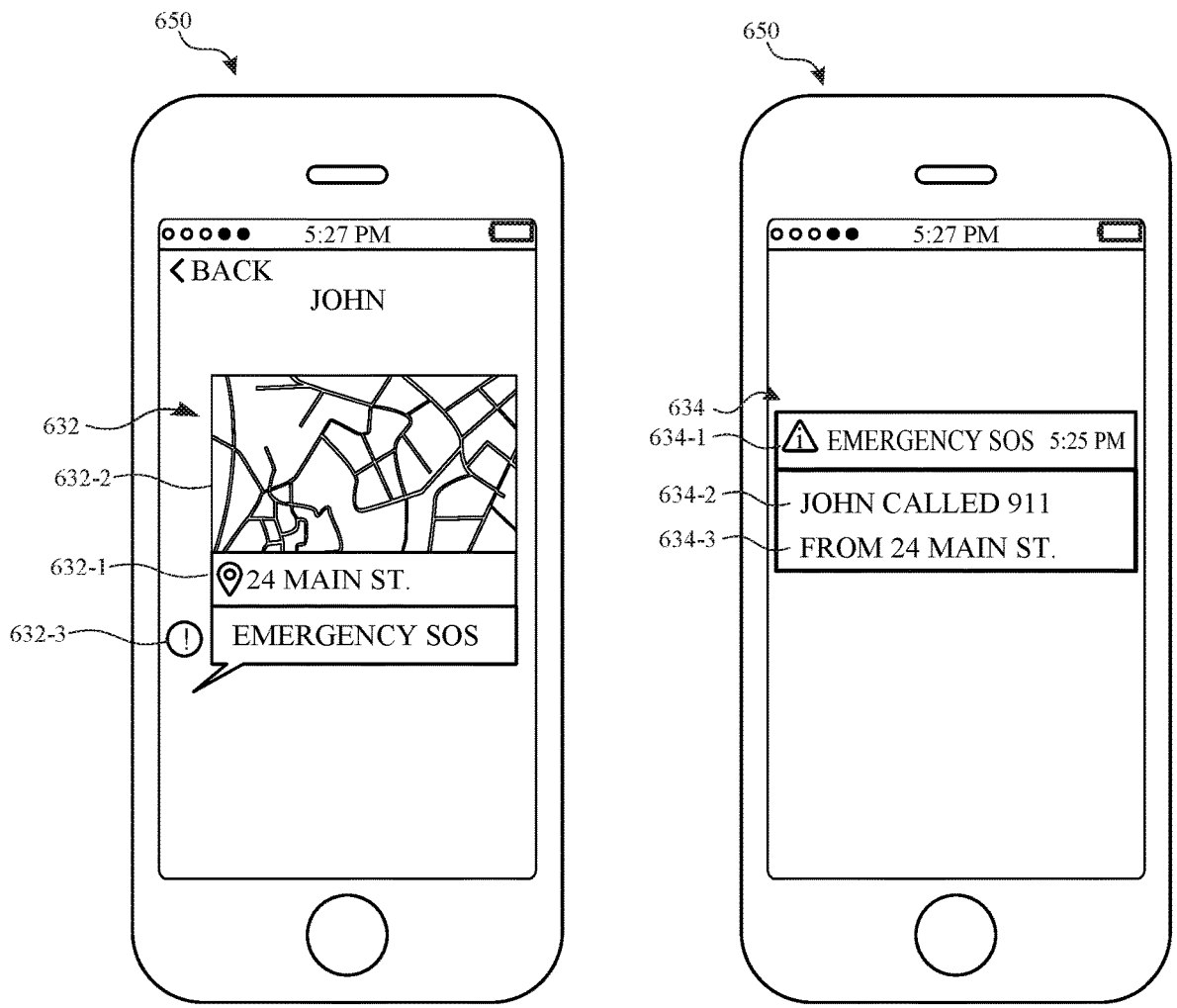

FIG. 6O illustrates an exemplary message 632 displayed, e.g., in a messaging application on external device 650 that is in communication with device 600. Message 632 includes an indication 632-1 of the location oft device 600, a map 632-2 showing the location of device 600, and an indication 632-3 of an emergency. In some embodiments, map 632-2 includes a link to directions to the location of device 600. In some embodiments, external device 650 receives the message and displays a notification of the message (e.g., on a lock screen, as a pop-up, and/or as a banner). FIG. 6P illustrates an embodiment of a notification 634 that is displayed on a lock screen of external device 650 associated with a contact to which the message is sent. Notification 634 includes an indication 634-1 of an emergency, an indication 634-2 that an emergency call was made by a user associated with device 600, and the location 634-3 of device 600. In notification 634, the indication 634-1 of the emergency includes text (e.g., "Emergency S.O.S.") and an image (e.g., a yellow triangle with an exclamation point).

In some embodiments, the content of the message depends on the type of device to which the message is to be sent. For example, in some embodiments, a message to a device (e.g., a smartphone, tablet, etc.) using the operating system iOS, provided by Apple Inc. of Cupertino, California, includes an image and a link to directions to navigate to the location; a message to a device using the operating system Android includes a web link to the location in a web-based map application (e.g., Google Maps); and a message to a non-feature phone or non-smartphone includes only text (e.g., a message that the user associated with device 600 made an emergency call and coordinates indicating a location).

In some embodiments, device 600 causes the message(s) to be sent to the predetermined set of contacts after causing initiation of the telephone call. In some embodiments, the message is sent without placing an emergency call (e.g., device 600 optionally sends the message in response to input 620-1). In some embodiments, the message is caused to be sent in response to any of the events described above that cause initiation of the call (e.g., selection of affordance 606-3 or visual indication 606-4, a determination that the countdown is complete, a determination that user input 620-1 exceeded the third predetermined amount of time, etc.). In some embodiments, the message is caused to be sent in response to, concurrently with, or shortly after causing initiation of the call. In some embodiments, device 600 displays an affordance (e.g., a confirmation affordance), and in response to selection of the affordance, causes the at least one message to be sent.

In some embodiments, device causes the message(s) to be sent to the predetermined set of contacts after the call has ended. The call can end in response to, e.g., user input (as described above), a loss or interruption in the communication signal with the determined number, or ending of the call by the party at the determined number (e.g., hanging up). In some embodiments, device 600 determines that the call has ended. In some embodiments, device 600 determines that the telephone call has ended based on data received (e.g., from a phone facilitating the telephone call) indicating that the call has ended. In some embodiments, device 600 determines that the telephone call has ended based on user input at device 600 to end the call, such as, e.g., user input 620-5 described above and/or selection of affordance 624 in FIG. 6J.

Figure 6Q:
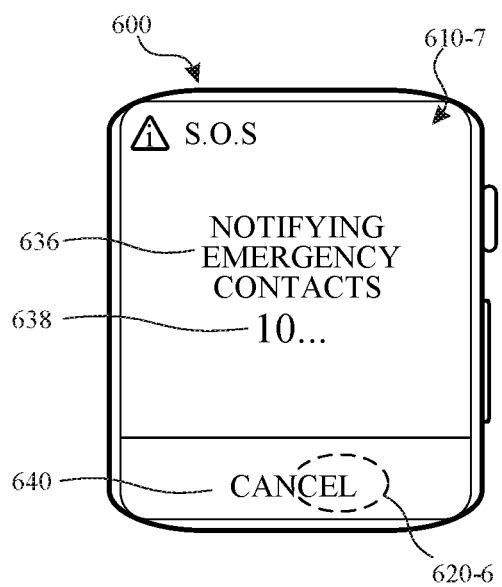

In some embodiments, device 600 causes the at least one message to be sent a predetermined amount of time after determining that the telephone call has ended. FIG. 6Q illustrates a user interface screen 610-7 displayed by device 600 after determining that the telephone call has ended. In the illustrated embodiment, device 600 initiates a countdown to the time at which the message(s) are to be sent to the predetermined set of contacts. In some embodiments, the duration of the countdown is ten seconds. Optionally, device 600 provides a haptic output during the countdown. It should be acknowledged that the countdown described here with reference to FIG. 6Q is separate and distinct from the countdown to initiating the call described with reference to FIGS. 6L-6N.

Figure 6R:
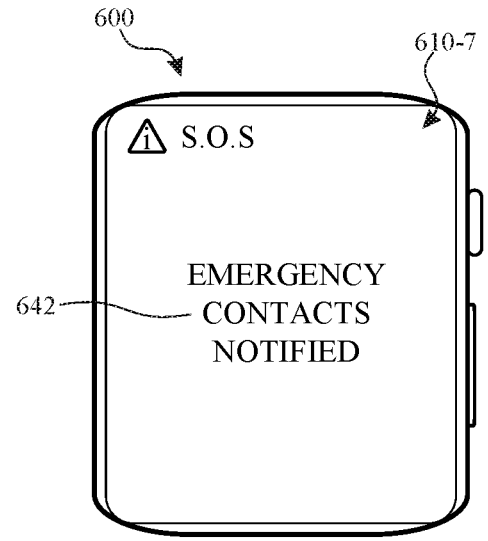
Figure 6S:
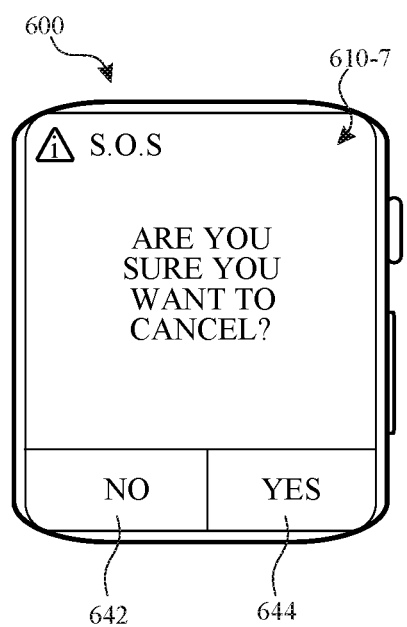
Figure 6T:
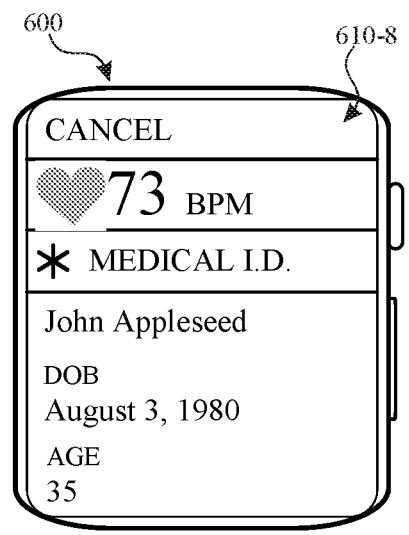
Figure 6U:
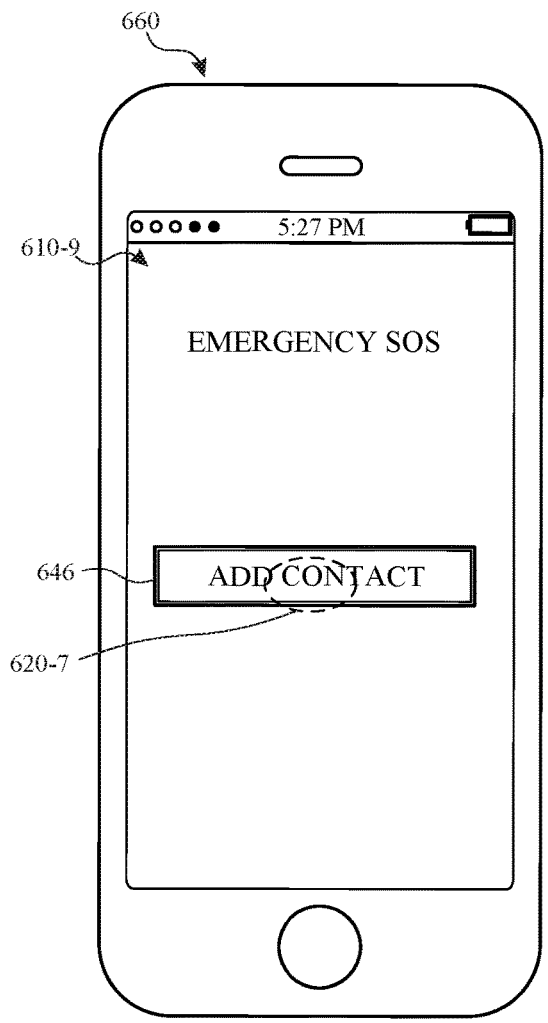

User interface screen 610-7 (FIGS. 6Q-6S) includes an indication 636 that contacts (e.g., emergency contacts) are going to be notified and an indication 638 of the amount of time remaining in the countdown before the contacts are to be notified. Indication 638 is a numeric indication. In some embodiments, user interface screen 610-7 includes a progress bar or other indication of the amount of time remaining in the countdown. When the countdown completes, device 600 causes the message(s) to be sent and displays an indication 642 that the predetermined set of contacts has been notified, as shown in FIG. 6R.

In some embodiments, the countdown to sending the message(s) can be interrupted or canceled by user input. For example, in FIG. 6Q, device 600 detects user input 620-6 (e.g., a tap) on affordance 640 labeled "Cancel". In response to user input 620-6, device 600 displays the option shown in FIG. 6S, which prompts the user to confirm whether the countdown to sending the at least one message is to be canceled. If affordance 644 labeled "No" is selected, then the countdown is not canceled and, e.g., resumes from where it left off at the time affordance 640 "Cancel" was selected or restarts from its initial value (e.g., ten seconds). If affordance 644 labeled "Yes" is selected, then the countdown is canceled and device 600 does not cause the at least one message to be sent.

In some embodiments, user input 620-6 includes a contact on the touch-sensitive display with a characteristic intensity that exceeds a threshold intensity, and device 600 cancels the countdown or displays affordance 642 ("No") and affordance 644 ("Yes") (or further instructions for canceling the countdown) in accordance with a determination that the characteristic intensity of contact 620-6 exceeds the threshold intensity.

A user interface can be provided to allow a user to designate the set of predetermined contacts to which the message(s) are to be sent. In some embodiments, the user interface for designating the set of predetermined contacts is provided on device 600. In some embodiments, the user interface is provided on an external device that is configured to be paired with device 600 (e.g., a phone or tablet). In some embodiments, the external device may have a larger display that makes it easier for a user to select contacts.

Figure 6V:
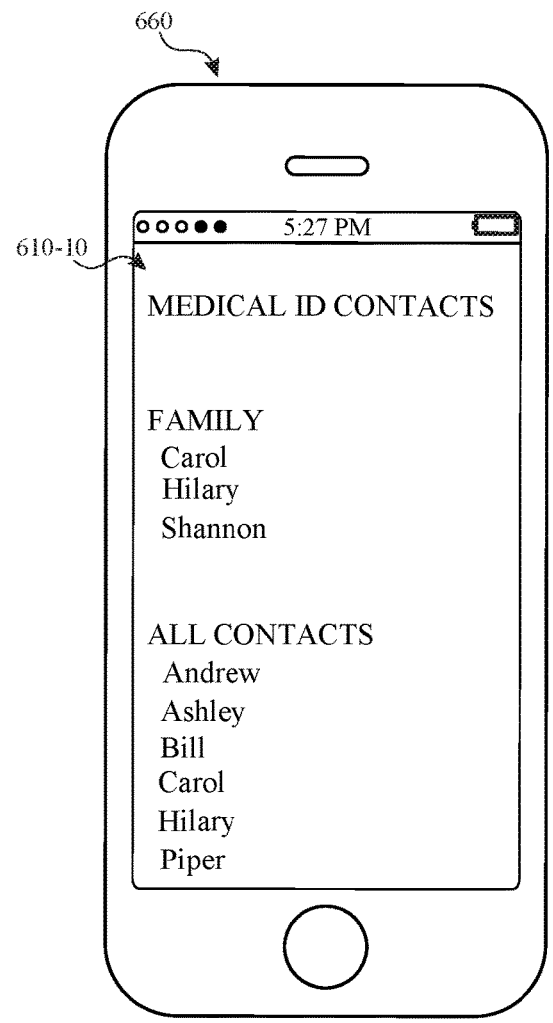
Figure 6W:
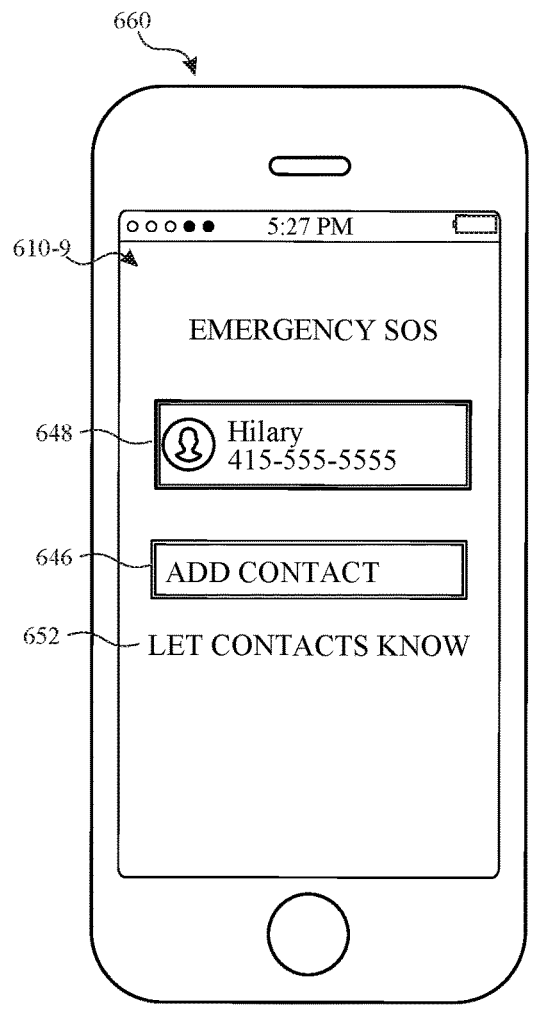
Figure 6X:
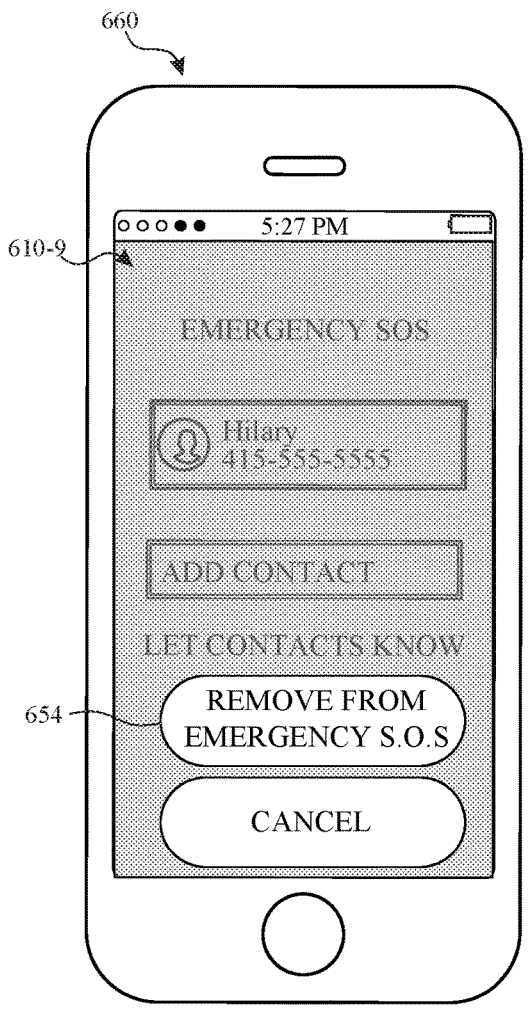

FIGS. 6U-6X illustrate exemplary user interface screens displayed on an external device 660 for designating a set of predetermined contacts. User interface screen 610-9 in FIG. 6U includes affordance 646 labeled "Add Contact". In response to user input 620-7 on affordance 646, external device 660 displays a list of user contacts and/or fields for entering the name and number of a contact so that the contact can be added to the set of contacts. In FIG. 6V, the user contacts are organized and displayed on user interface screen 610-10 according to the categories "Medical ID Contact", "Family", and "All Contacts." In some embodiments, the existing set of designated contacts is displayed in a designated area of the contacts list. In the user interface screen 610-10, since the user has yet to add a contact to the set, there are no designated Medical ID contacts shown on user interface screen 610-10. External device 660 detects a user input (e.g., a tap) corresponding to selection of contact "Hilary". In response, external device 660 displays an updated version of user interface screen 610-9 shown in FIG. 6W including a representation 648 (e.g., a profile) of the contact including, e.g., name, number, and a representative image (e.g., a picture associated with the contact).

The updated user interface screen 610-9 also includes affordance 652 labeled "Let Contacts Know". In response to user input (e.g., selection of affordance 652), external device 660 causes a message to be sent to one or more of the numbers associated with the set of contacts to inform the contact(s) that they has been designated as an emergency contact by the user (e.g., to receive emergency notifications related to the user associated with device 600). In some embodiments, in response to receiving the notification, the contact may be prompted to accept or deny being included in the set of predetermined contacts (e.g., opt in or out as an emergency contact). In some embodiments, external device 660 receives data indicating whether the contact has accepted or denied.

In some embodiments, in response to user input (e.g., a tap on the representation 648 of a contact), external device 660 displays an option (e.g., affordance 654) to remove a corresponding contact from the set of designated contacts.

As mentioned above, device 600 can also display medical information. FIG. 6T illustrates an exemplary user interface screen 610-8 with medical information. Device 600 displays medical information in response to selection (e.g., user input 620-3) of affordance 606-2 in FIG. 6D. Optionally, device 600 displays medial information after, or in response to determining that, the telephone call has ended. Optionally, device 600 displays medical information automatically after message(s) have been sent to the predetermined set of contacts as described above.

The medical information on user interface screen 610-8 includes heartrate (e.g., 73 beats per minute (BPM)), name (e.g., "John Appleseed"), date of birth (DOB: Aug. 3, 1980), and age (e.g., 35). Other non-limiting examples of medical information include medical conditions (e.g., memory impaired), allergies (e.g., allergic to penicillin), medications/dosages, past surgical history, etc. In some embodiments, device 600 includes a sensor configured to detect heart rate. In some embodiments, device 600 causes user interface screen 610-8 (or a portion thereof) to flash and/or provides audio output while the medical information is displayed. Flashing the screen and/or providing audio output may draw attention to device 600, which may assist medical professionals or first responders if, for example, the user of device 600 is unconscious.

Figure 7A:
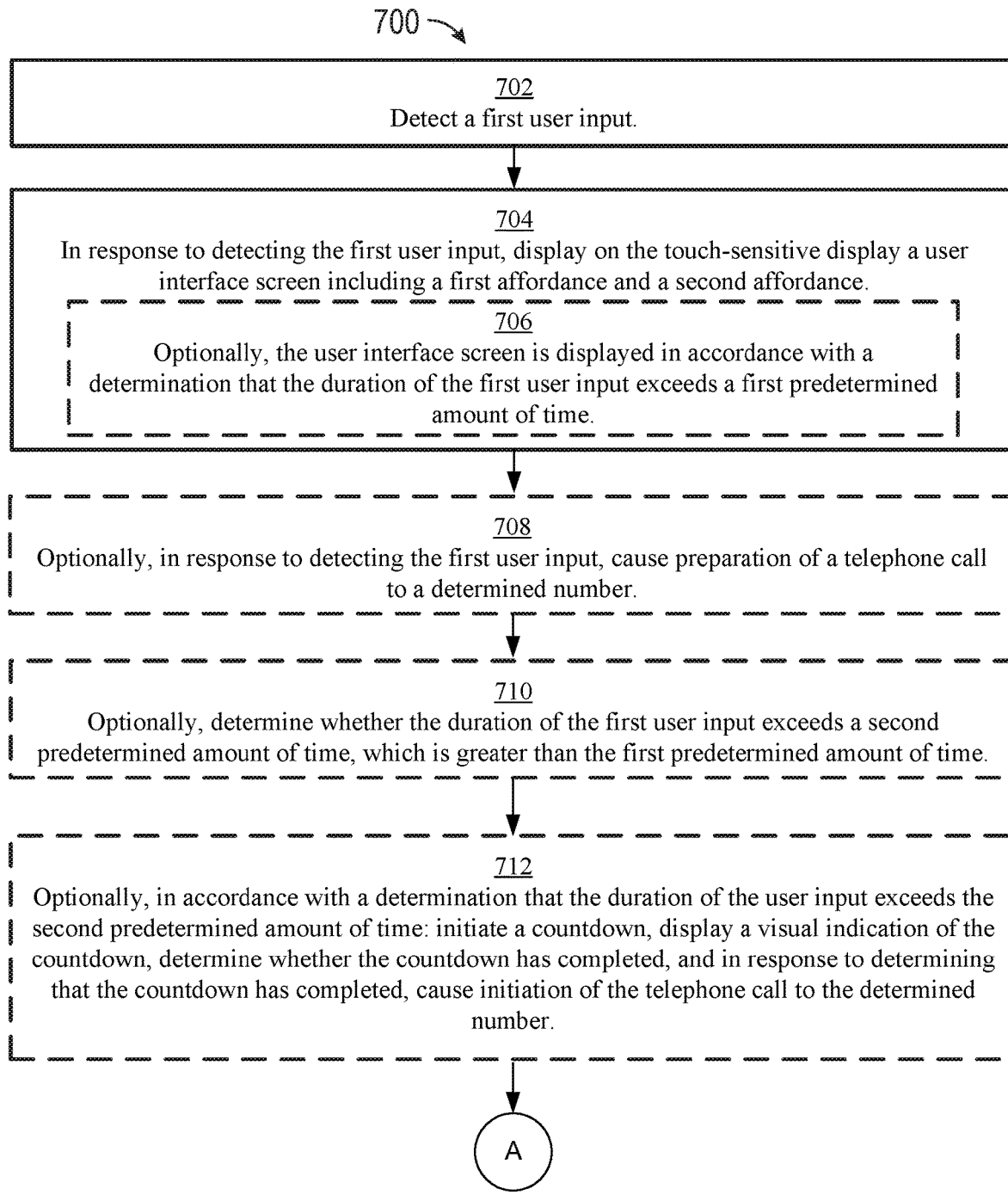
FIGS. 7A-7C are flow diagrams illustrating a process for initiating a telephone call in accordance with some embodiments.
Figure 7B:
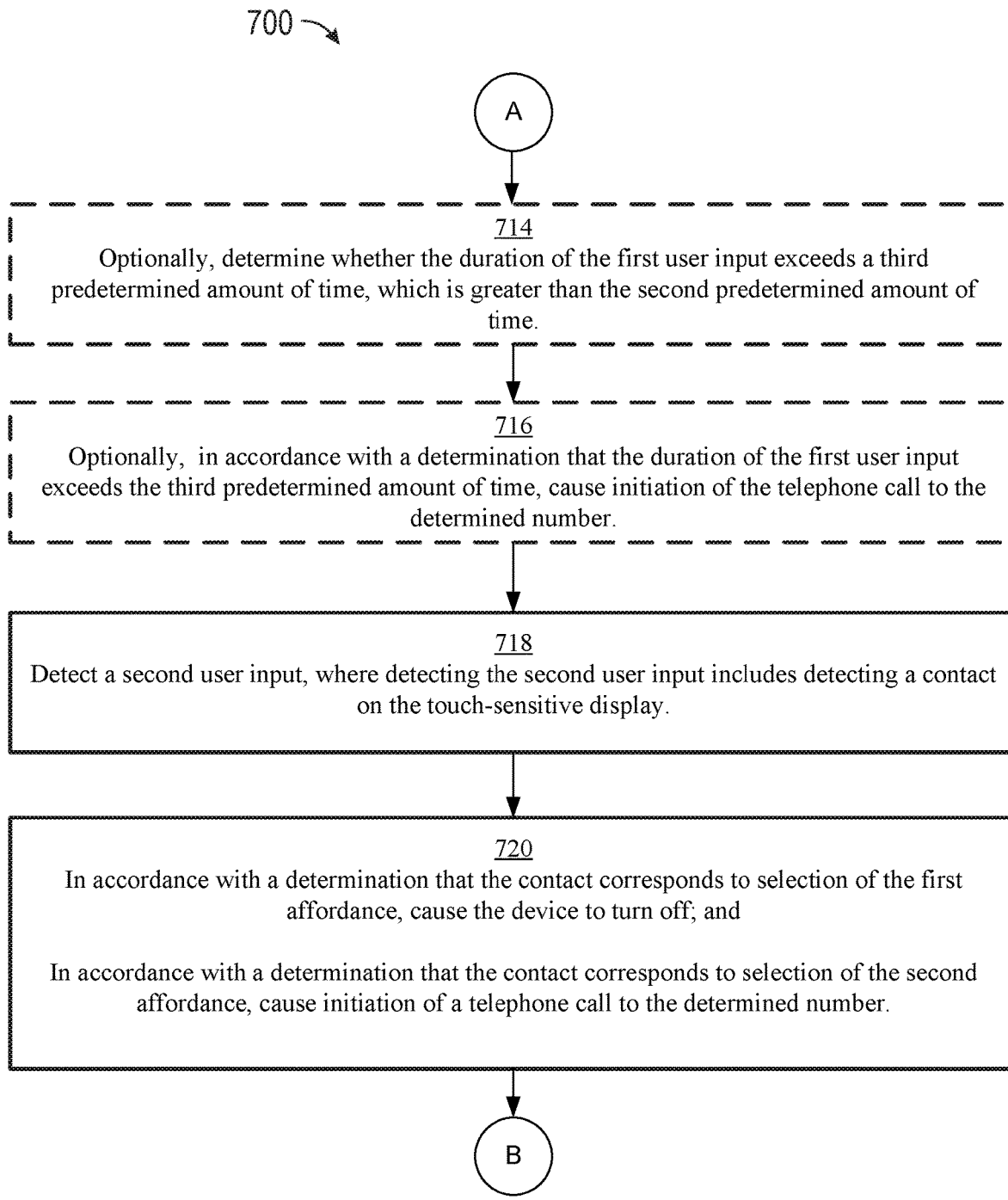
Figure 7C:
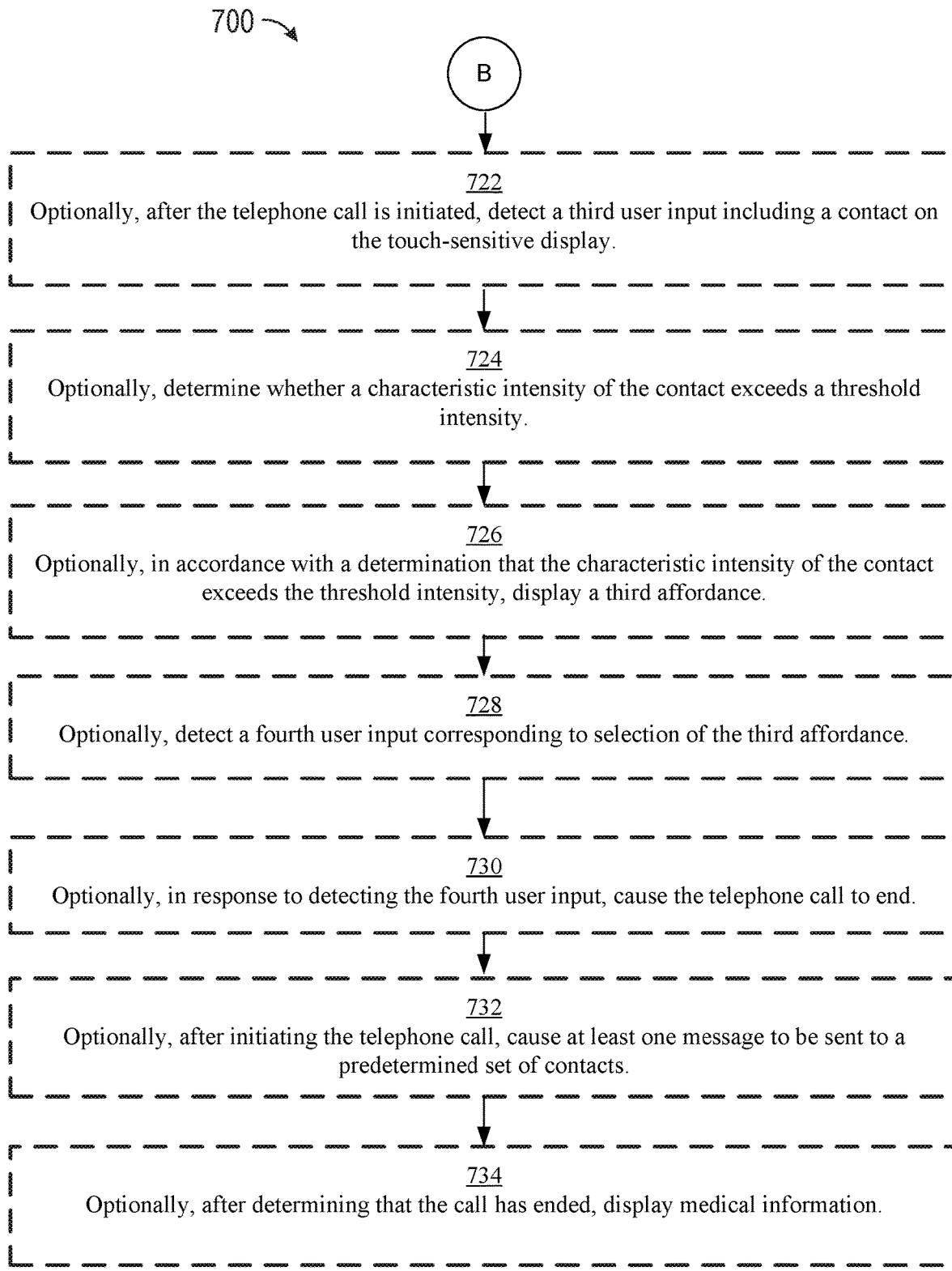

FIGS. 7A-7C are flow diagrams illustrating a method for initiation a telephone call using an electronic device in accordance with some embodiments. Method 700 is performed at a device (e.g., 100, 300, 500, or 600) with a touch-sensitive display (e.g., 602). Some operations in method 700 are, optionally, combined, the order of some operations are, optionally, changed, and some operations are, optionally, omitted.

As described below, method 700 provides an intuitive way for initiating a telephone call. The method reduces the cognitive burden on a user for initiating a telephone call, thereby creating a more efficient human-machine interface. For battery-operated computing devices, enabling a user to initiate a telephone call faster and more efficiently conserves power and increases the time between battery charges.

At block 702, the device detects a first user input (e.g., 620-1). In some embodiments, the first user input is a press of a physical button (e.g., 604) on the device.

At block 704, in response to detecting the first user input, the device displays on the touch-sensitive display a user interface screen (e.g., 610-2) including a first affordance (e.g., 606-1) and a second affordance (e.g., 606-3). Optionally, at block 706, the user interface screen is displayed in accordance with a determination that the duration of the first user input exceeds a first predetermined amount of time. Optionally, at block 708, further in response to detecting the first user input, the device causes preparation of a telephone call to a determined number.

Optionally, at block 710, the device determines whether the duration of the first user input exceeds a second predetermined amount of time, which is greater than the first predetermined amount of time. Optionally, at block 712, in accordance with a determination that the duration of the user input exceeds the second predetermined amount of time, the device initiates a countdown, displays a visual indication of the countdown (e.g., 606-4), determines whether the countdown has completed, and in response to determining that the countdown has completed, causes initiation of the telephone call to the determined number. In some embodiments, the visual indication of the countdown is displayed at the second affordance (e.g., 606-3). In some embodiments, the device provides a haptic output while displaying the visual indication of the countdown.

Optionally, at block 714, the device determines whether the duration of the first user input exceeds a third predetermined amount of time, which is greater than the second predetermined amount of time. Optionally, at block 716, in accordance with a determination that the duration of the first user input exceeds the third predetermined amount of time, the device causes initiation of the telephone call to the determined number.

At block 718, the device detects a second user input (e.g., 620-2 or 620-4), where detecting the second user input includes detecting a contact on the touch-sensitive display.

At block 720, in accordance with a determination that the contact corresponds to selection of the first affordance (e.g., 620-2), the device causes itself to turn off (e.g., FIG. 6C), or alternatively, in accordance with a determination that the contact corresponds to selection of the second affordance (e.g., 620-4), the device causes initiation of a telephone call to a determined number (e.g., FIG. 6E).

Optionally, at block 722, after the telephone call is initiated, the device detects a third user input including a contact (e.g., 620-5) on the touch-sensitive display. Optionally, at block 724, the device determines whether a characteristic intensity of the contact exceeds a threshold intensity. Optionally, at block 726, in accordance with a determination that the characteristic intensity of the contact exceeds the threshold intensity, the device displays a third affordance (e.g., 624). Optionally, at block 728, the device detects a fourth user input corresponding to selection of the third affordance. Optionally, at block 730, in response to detecting the fourth user input, the device causes the telephone call to end (e.g., FIG. 6J-6K).

Optionally, at block 732, after initiating the telephone call (e.g., in response to the telephone call being initiated), the device causes at least one message (e.g., 632) to be sent to a predetermined set of contacts (e.g., 648). In some embodiments, the device causes the at least one message to be sent after a determination that the telephone call has ended. In some embodiments, the at least one message includes data indicating a user of the device, data indicating the location of the device, and/or data indicating an emergency. In some embodiments, the device causes the at least one message to be sent a predetermined amount of time after determining that the telephone call has ended (e.g., FIG. 6Q).

Optionally, at block 734, after determining that the call has ended, the device displays medical information (e.g., 610-8).

Note that details of the processes described above with respect to method 700 (e.g., FIGS. 7A-7C) are also applicable in an analogous manner to the methods described below. For example, method 900 optionally includes one or more of the characteristics of the various methods described above with reference to method 700.

Figure 8:
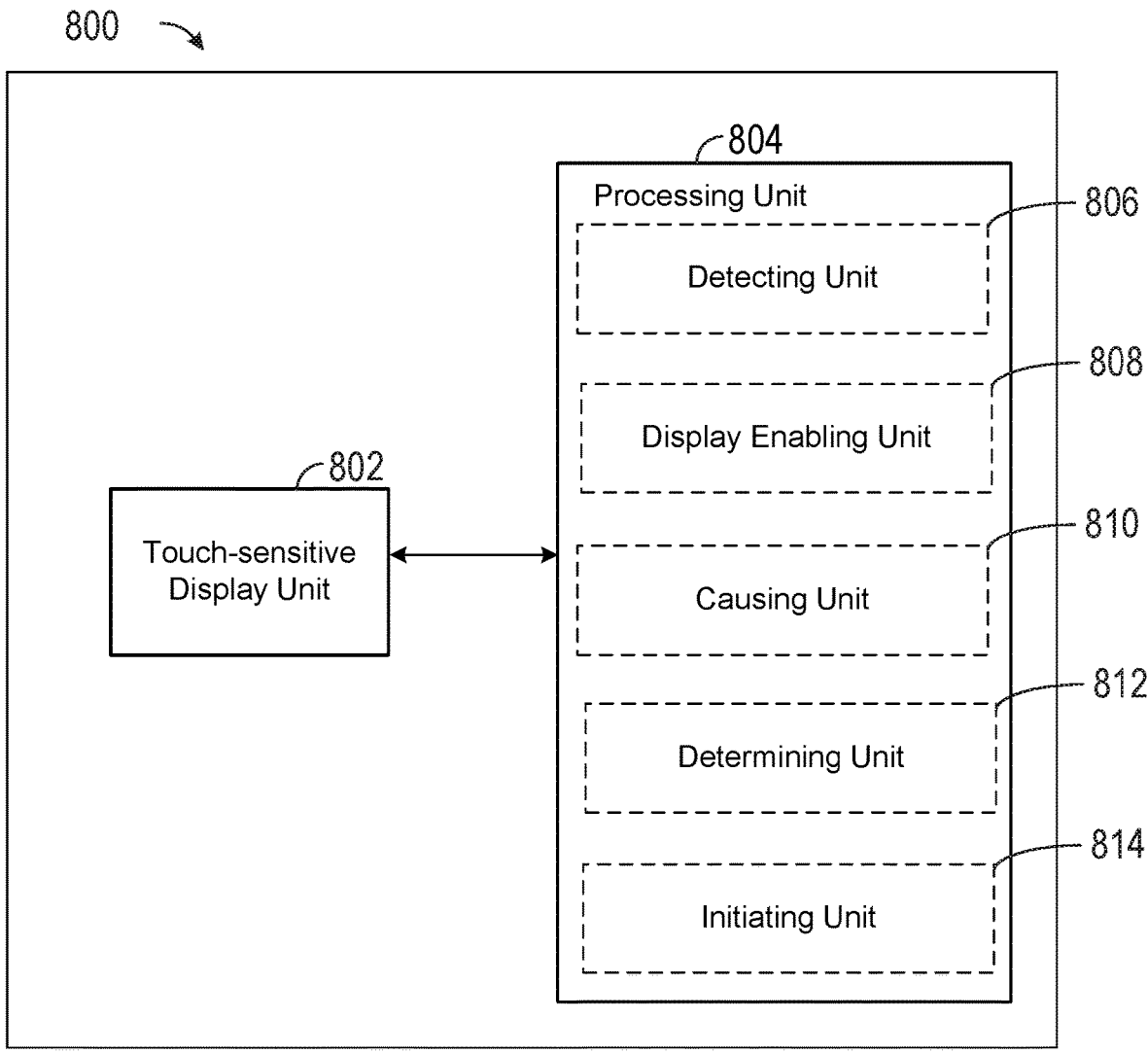
FIG. 8 is a functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a touch-sensitive display unit 802 configured to display a graphic user interface and receive contacts and a processing unit 804 coupled to the touch-sensitive display unit 802. In some embodiments, the processing unit 804 includes a detecting unit 806, a display enabling unit 808, a causing unit 810, a determining unit 812, and an initiating unit 814.

The processing unit 804 is configured to: detect (e.g., with detecting unit 806) a first user input; in response to detecting the first user input, enable display (e.g., with display enabling unit 808), on the touch-sensitive display, of a user interface screen including a first affordance and a second affordance; detect (e.g., with detecting unit 806) a second user input including detecting a contact on the touch-sensitive display; in accordance with a determination that the contact corresponds to selection of the first affordance, cause (e.g., with causing unit 810) the electronic device to turn off; and in accordance with a determination that the contact corresponds to selection of the second affordance, cause (e.g., with causing unit 810) initiation of a telephone call to a determined number. In some embodiments, the first user input is a press of a physical button on the electronic device.

In some embodiments, the processing unit 804 is further configured to determine (e.g., with determining unit 812) whether the duration of the first user input exceeds a first predetermined amount of time, where display of the user interface screen is enabled further in accordance with a determination that the duration of the first user input exceeds the first predetermined amount of time.

In some embodiments, the processing unit 804 is further configured to determine (e.g., with determining unit 812) whether the duration of the first user input exceeds a second predetermined amount of time, and in accordance with a determination that the duration of the user input exceeds the second predetermined amount of time: initiate (e.g., with initiating unit 814) a countdown, where initiating the countdown includes enabling display (e.g., with display enabling unit 808) of a visual indication of the countdown; determine (e.g., with determining unit 812) that the countdown has completed; and in response to determining that the countdown has completed, cause (e.g., with causing unit 810) initiation of the telephone call to the determined number.

In some embodiments, the processing unit 804 is further configured to cause (e.g., with causing unit 810) a haptic output while the visual indication of the countdown is displayed.

In some embodiments, the processing unit 804 is further configured to determine (e.g., with determining unit 812) whether the duration of the first user input exceeds a third predetermined amount of time, and in accordance with a determination that the duration of the first user input exceeds the third predetermined amount of time, cause (e.g., with causing unit 810) initiation of the telephone call to the determined number. In some embodiments, the third predetermined amount of time is greater than the second predetermined amount of time, and the second predetermined amount of time is greater than the first predetermined amount of time.

In some embodiments, selection of the first affordance includes movement of the contact from a first predetermined location on the touch-sensitive display to a second location on the touch-sensitive display. In some embodiments, selection of the second affordance includes movement of the contact from a third predetermined location on the touch-sensitive display to a fourth location on the touch-sensitive display.

In some embodiments, the processing unit 804 is further configured to, further in response to detecting the first user input and before detecting the second user input, cause (e.g., with causing unit 810) preparation of the telephone call to the determined number.

In some embodiments, the processing unit 804 is further configured to: after the telephone call is initiated, detect (e.g., with detecting unit 806) a third user input including a contact on the touch-sensitive display, where the contact has a characteristic intensity; determine (e.g., with determining unit 812) whether the characteristic intensity of the contact exceeds a threshold intensity; in accordance with a determination that the characteristic intensity of the contact exceeds the threshold intensity, enable display (e.g., with display enabling unit 808) of a third affordance; detect (e.g., with detecting unit 806) a fourth user input corresponding to selection of the third affordance; and in response to detecting the fourth user input, cause (e.g., with causing unit 810) the telephone call to end.

In some embodiments, the processing unit 804 is further configured to, in response to causing initiation of the telephone call, cause (e.g., with causing unit 810) at least one message to be sent to a predetermined set of contacts.

In some embodiments, the processing unit 804 is further configured to, determine (e.g., with determining unit 812) that the telephone call has ended, and in response to determining that the telephone call has ended, cause (e.g., with causing unit 810) at least one message to be sent to a predetermined set of contacts. In some embodiments, the at least one message is caused to be sent a predetermined amount of time after determining that the telephone call has ended. In some embodiments, the at least one message includes data indicating the location of the electronic device. In some embodiments, the at least one message includes data indicating an emergency.

In some embodiments, the processing unit 804 is further configured to determine (e.g., with determining unit 812) that the telephone call has ended, and after determining that the telephone call has ended, enable display (e.g., with display enabling unit 808) of medical information.

The operations described above with reference to FIGS. 7A-7C are, optionally, implemented by components depicted in FIGS. 1A-1B or FIG. 8. For example, detecting operations 702, 718, 722, and 728, displaying operations 704, 706, 712, 726, and 734, causing operations 708, 712, 716, 720, 730, and 732, determining operations 710, 712, 714, and 724, and initiating operation 712 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9A:
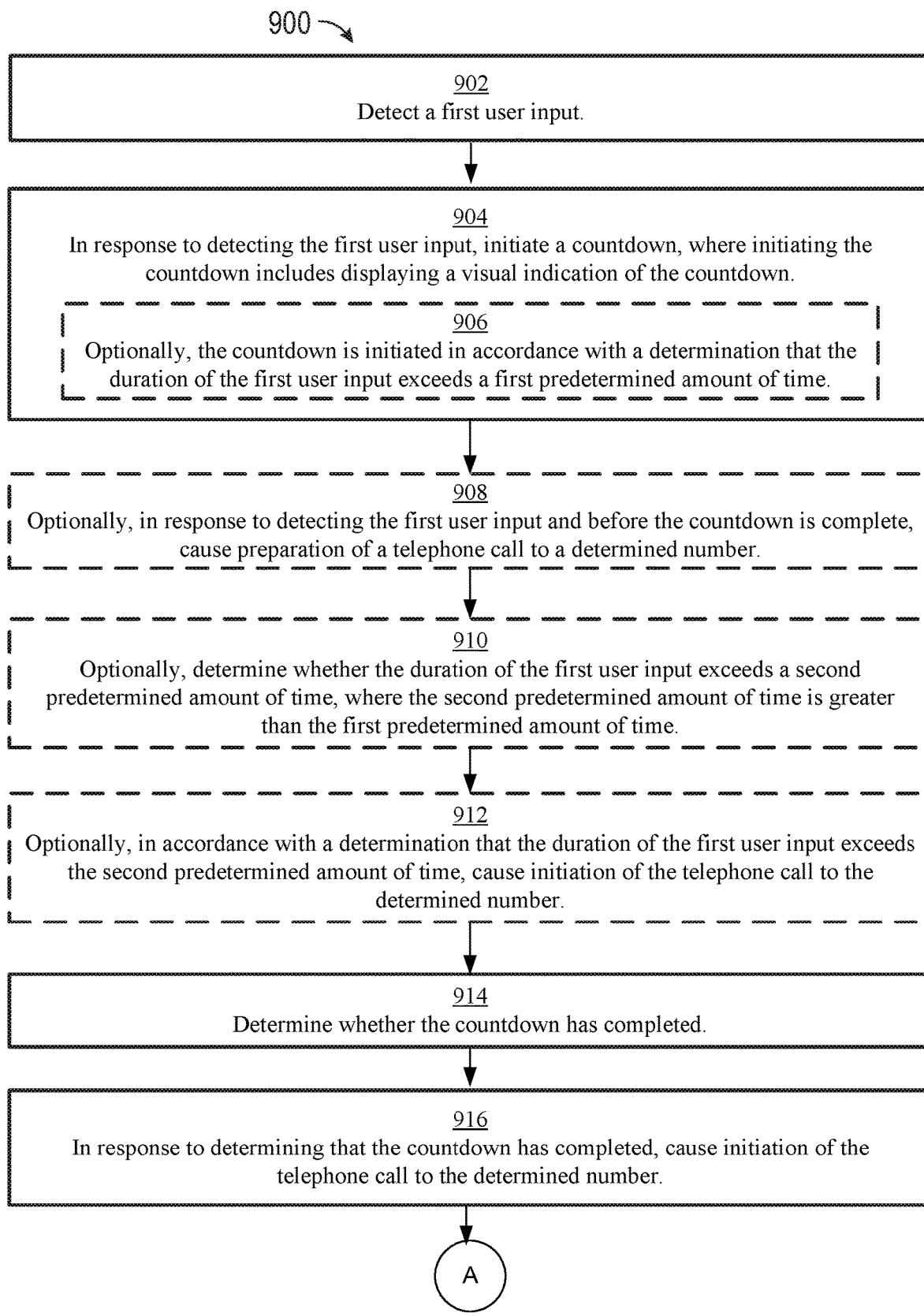
FIGS. 9A-9B are flow diagrams illustrating a process for initiating a telephone call in accordance with some embodiments.
Figure 9B:
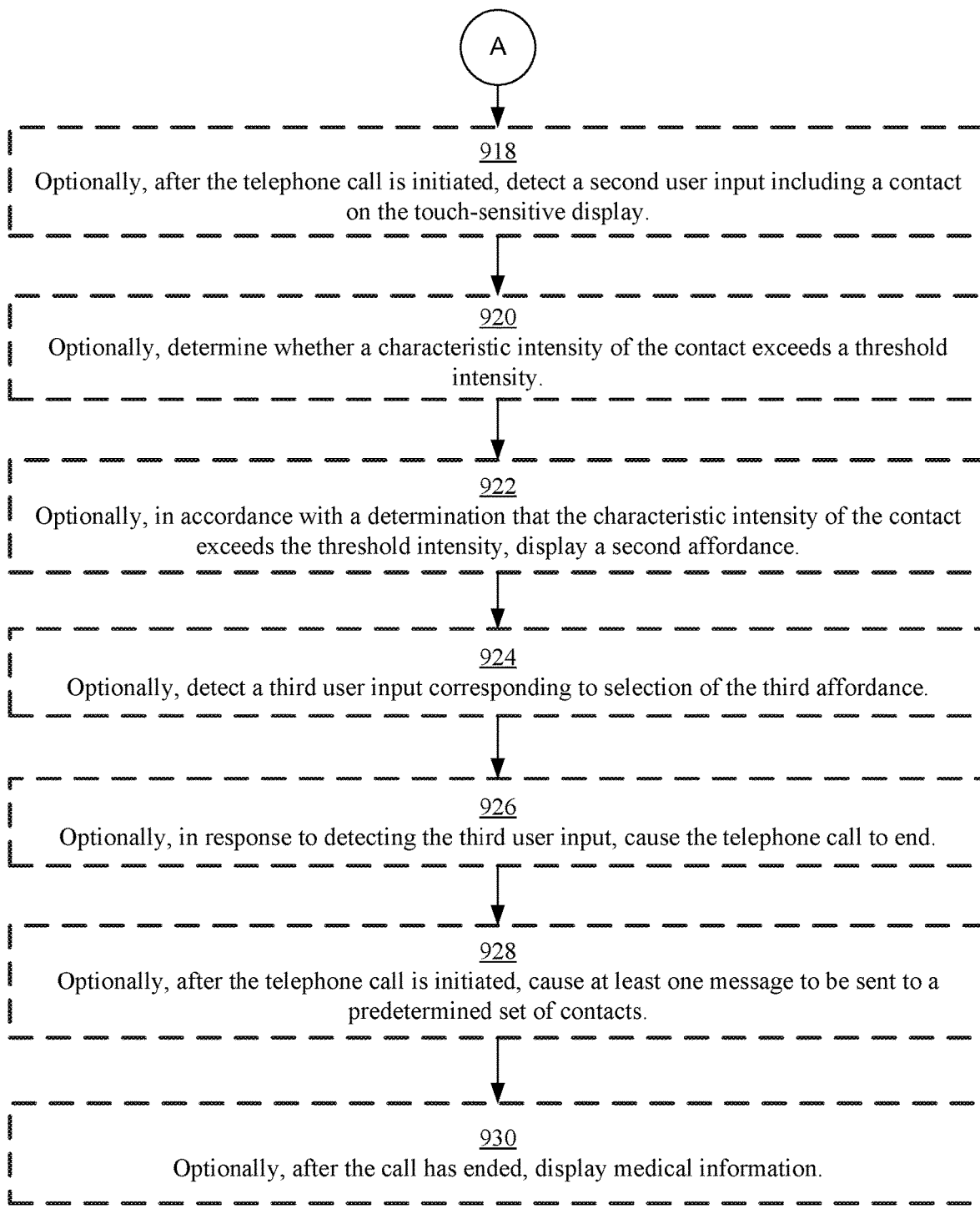

FIGS. 9A-9B are flow diagrams illustrating a method for initiating a telephone call using an electronic device in accordance with some embodiments. Method 900 is performed at a device (e.g., 100, 300, 500, 600) with a touch-sensitive display. Some operations in method 900 are, optionally, combined, the order of some operations are, optionally, changed, and some operations are, optionally, omitted.

As described below, method 900 provides an intuitive way for initiating a telephone call. The method reduces the cognitive burden on a user for initiating a telephone call, thereby creating a more efficient human-machine interface. For battery-operated computing devices, enabling a user to initiate a telephone call faster and more efficiently conserves power and increases the time between battery charges.

At block 902, the device detects a first user input (e.g., 620-1). In some embodiments, the first user input is a press of a physical button (e.g., 604) on the device.

At block 904, in response to detecting the first user input, the device initiates a countdown, where initiating the countdown includes displaying a visual indication (e.g., 606-4) of the countdown on the display. Optionally, at block 906, the countdown is initiated in accordance with a determination that the duration of the first user input exceeds a first predetermined amount of time. Optionally, the device provides a haptic output while displaying the visual indication of the countdown.

Optionally, at block 908, further in response to detecting the first user input and before the countdown is complete, the device causes preparation of a telephone call to a determined number.

Optionally, at block 910, the device determines whether the duration of the first user input exceeds a second predetermined amount of time, where the second predetermined amount of time is greater than the first predetermined amount of time. Optionally, at block 912, in accordance with a determination that the duration of the first user input exceeds the second predetermined amount of time, the device causes initiation of the telephone call to the determined number.

At block 914, the device determines whether the countdown has completed. At block 916, in response to determining that the countdown has completed, the device causes initiation of the telephone call to the determined number.

Optionally, at block 918, after the telephone call is initiated, the device detects a second user input (e.g., 620-5) including a contact on the touch-sensitive display. Optionally, at block 920, the device determines whether a characteristic intensity of the contact exceeds a threshold intensity. Optionally, at block 922, in accordance with a determination that the characteristic intensity of the contact exceeds the threshold intensity, the device displays a second affordance (e.g., 624). Optionally, at block 924, the device detects a third user input corresponding to selection of the third affordance. Optionally, at block 926, in response to detecting the third user input, the device causes the telephone call to end (e.g., FIG. 6K).

Optionally, at block 928, after the telephone call is initiated (e.g., in response to causing initiation of the telephone call), the device causes at least one message (e.g., 632) to be sent to a predetermined set of contacts (e.g., 648). In some embodiments, the device causes the at least one message to be sent after a determination that the telephone call has ended. In some embodiments, the at least one message includes data indicating a user of the device, data indicating the location of the device, and/or data indicating an emergency. In some embodiments, the device causes the at least one message to be sent a predetermined amount of time after determining that the telephone call has ended (e.g., FIG. 6Q-6R).

Optionally, at block 930, after determining that the call has ended, the device displays medical information (e.g., 610-8).

Note that details of the processes described above with respect to method 900 (e.g., FIGS. 9A-9B) are also applicable in an analogous manner to the other methods described above. For example, method 700 optionally includes one or more of the characteristics of the various methods described above with reference to method 900.

Figure 10:
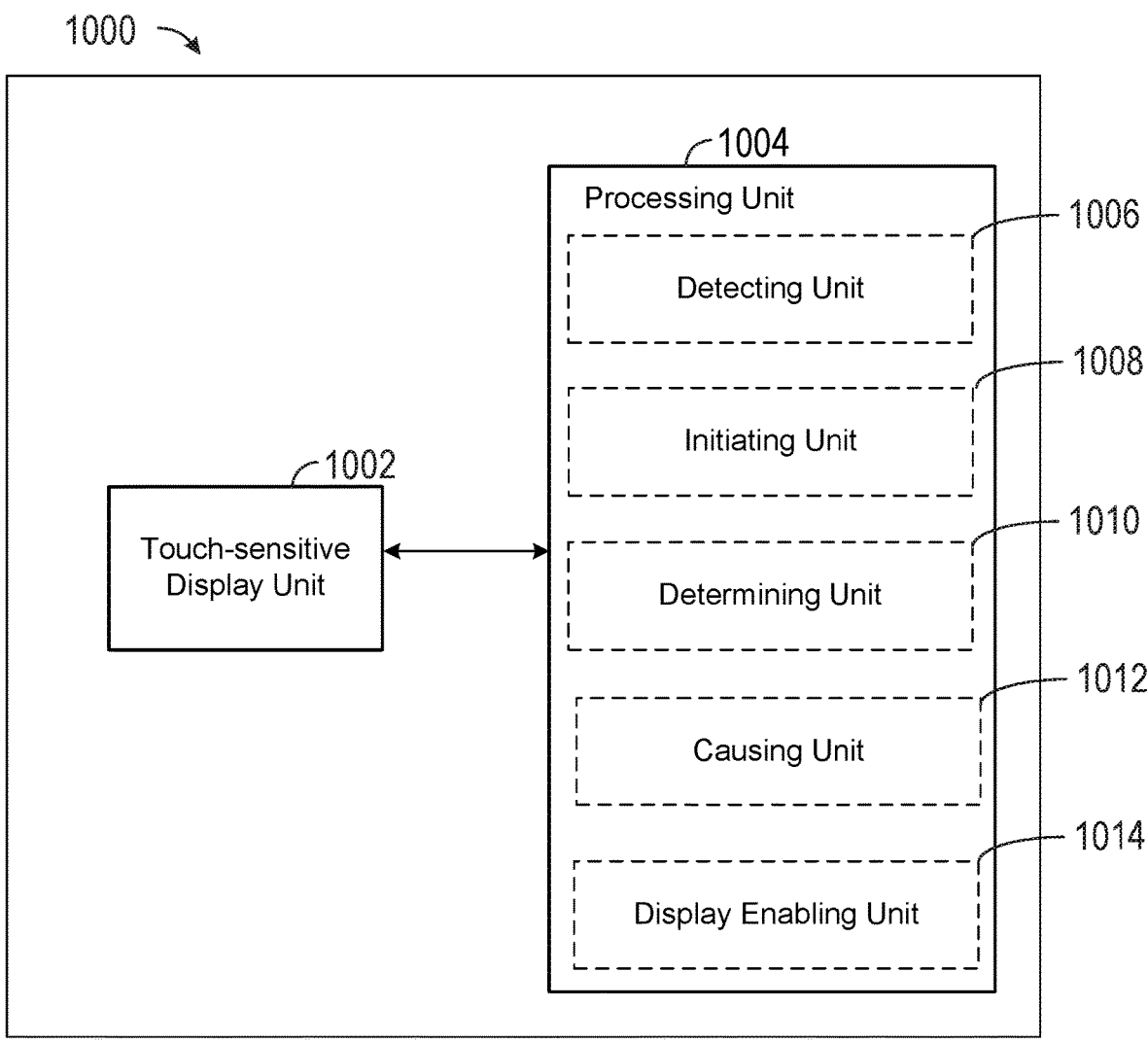
FIG. 10 is a functional block diagram of an electronic device in accordance with some embodiments.

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a touch-sensitive display unit 1002 configured to display a graphic user interface and to receive contacts, and a processing unit 1004 coupled to the touch-sensitive display unit 1002. In some embodiments, the processing unit 1004 includes a detecting unit 1006, an initiating unit 1008, a determining unit 1010, a causing unit 1012, and a display enabling unit 1014.

The processing unit 1004 is configured to: detect (e.g., with detecting unit 1006) a first user input; in response to detecting the first user input, initiate (e.g., with initiating unit 1008) a countdown, where initiating the countdown includes enabling display of a visual indication of the countdown on the display; determine (e.g., with determining unit 1010) that the countdown has completed; and in response to determining that the countdown has completed, cause (e.g., with causing unit 1012) initiation of a telephone call to a determined number. In some embodiments, the first user input is a press of a physical button on the electronic device.

In some embodiments, the processing unit 1004 is further configured to determine (e.g., with determining unit 1010) whether the duration of the first user input exceeds a first predetermined amount of time, where the countdown is initiated in accordance with a determination that the duration of the first user input exceeds the first predetermined amount of time.

In some embodiments, the processing unit 1004 is further configured to, while the visual indication of the countdown is displayed, cause (e.g., with causing unit 1012) a haptic output.

In some embodiments, the processing unit 1004 is further configured to: determine (e.g., with determining unit 1010) whether the duration of the first user input exceeds a second predetermined amount of time, where the second predetermined amount of time is greater than the first predetermined amount of time; and in accordance with a determination that the duration of the first user input exceeds the second predetermined amount of time, cause (e.g., with causing unit 1012) initiation of the telephone call to the determined number.

In some embodiments, the processing unit 1004 is further configured to, before the visual indication of the countdown is displayed and in response to detecting the first user input is displayed, enable display (e.g., with display enabling unit 1014) of a first affordance. Selection of the first affordance initiates the telephone call, and the visual indication of the countdown is displayed at the first affordance.

In some embodiments, the processing unit 1004 is further configured to, further in response to detecting the first user input and before the countdown is complete, cause (e.g., with causing unit 1012) preparation of the telephone call to the determined number.

In some embodiments, the processing unit 1004 is further configured to: after the telephone call is initiated, detect (e.g., with detecting unit 1006) a second user input including a contact on the touch-sensitive display, where the contact has a characteristic intensity; determine (e.g., with determining unit 1010) whether the characteristic intensity of the contact exceeds a threshold intensity; in accordance with a determination that the characteristic intensity of the contact exceeds the threshold intensity, enable display (e.g., with display enabling unit 1014) of a second affordance; detect (e.g., with detecting unit 1006) a third user input corresponding to selection of the third affordance; and in response to detecting the third user input, cause (e.g., with causing unit 1012) the telephone call to end.

In some embodiments, the processing unit 1004 is further configured to, in response to causing initiation of the telephone call, cause (e.g., with causing unit 1012) at least one message to be sent to a predetermined set of contacts. In some embodiments, the processing unit 1004 is further configured to, determine (e.g., with determining unit 1010) that the telephone call has ended, and in response to determining that the telephone call has ended, cause (e.g., with causing unit 1012) at least one message to be sent to a predetermined set of contacts. In some embodiments, the at least one message is caused to be sent a predetermined amount of time after determining that the telephone call has ended. In some embodiments, the at least one message includes data indicating the location of the electronic device. In some embodiments, the at least one message includes data indicating an emergency.

In some embodiments, the processing unit 1004 is further configured to determine (e.g., with determining unit 1010) that the telephone call has ended, and after determining that the telephone call has ended, enable display (e.g., with display enabling unit 1014) of medical information.

The operations described above with reference to FIGS. 9A-9B are, optionally, implemented by components depicted in FIGS. 1A-1B or FIG. 10. For example, detecting operations 902, 918, and 924, initiating operations 904 and 906, causing operations 908, 912, 916, 926, and 928, determining operations 910, 914, and 920, and displaying operations 922 and 930 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a touch-sensitive display;
   one or more processors;
   a memory; and
   one or more programs, wherein the one or more programs are stored in the memory and configured to be executed by the one or more processors, the one or more programs including instructions for:
   detecting a first user input;
   in response to detecting the first user input:
      displaying a first affordance, wherein selection of the first affordance initiates a telephone call to a determined number; and
      while continuing to detect the first user input, initiating a countdown, wherein initiating the countdown includes displaying a visual indication of the countdown on the display, wherein the visual indication of the countdown is displayed at a location corresponding to the first affordance;
   determining that the countdown has completed; and
   in response to determining that the countdown has completed, causing initiation of the telephone call to the determined number.

2. The electronic device of claim 1, the one or more programs further including instructions for:
   determining whether a duration of the first user input exceeds a first predetermined amount of time,
   wherein the countdown is initiated in accordance with a determination that the duration of the first user input exceeds the first predetermined amount of time.

3. The electronic device of claim 2, the one or more programs further including instructions for:
   determining whether the duration of the first user input exceeds a second predetermined amount of time, wherein the second predetermined amount of time is greater than the first predetermined amount of time; and
   in accordance with a determination that the duration of the first user input exceeds the second predetermined amount of time, causing initiation of the telephone call to the determined number.

4. The electronic device of claim 1, the one or more programs further including instructions for:
   while displaying the visual indication of the countdown, providing a haptic output.

5. The electronic device of claim 1, the one or more programs further including instructions for:
   further in response to detecting the first user input and before the countdown is complete, causing preparation of the telephone call to the determined number.

6. The electronic device of claim 1, the one or more programs further including instructions for:
   after the telephone call is initiated, detecting a second user input including a contact on the touch-sensitive display, wherein the contact has a characteristic intensity;
   determining whether the characteristic intensity of the contact exceeds a threshold intensity;
   in accordance with a determination that the characteristic intensity of the contact exceeds the threshold intensity, displaying a second affordance;
   detecting a third user input corresponding to selection of a third affordance; and
   in response to detecting the third user input, causing the telephone call to end.

7. The electronic device of claim 1, the one or more programs further including instructions for:
in response to causing initiation of the telephone call, causing at least one message to be sent to a predetermined set of contacts.

8. The electronic device of claim 1, the one or more programs further including instructions for:
determining that the telephone call has ended; and
in response to determining that the telephone call has ended, causing at least one message to be sent to a predetermined set of contacts.

9. The electronic device of claim 8, wherein the at least one message is caused to be sent a predetermined amount of time after determining that the telephone call has ended.

10. The electronic device of claim 8, wherein the at least one message includes data indicating a location of the electronic device.

11. The electronic device of claim 8, wherein the at least one message includes data indicating an emergency.

12. The electronic device of claim 1, the one or more programs further including instructions for:
determining that the telephone call has ended; and
after determining that the telephone call has ended, displaying medical information.

13. The electronic device of claim 1, wherein the first user input is a press of a physical button on the electronic device.

14. The electronic device of claim 1, wherein initiating the countdown includes ceasing to display at least a portion of the first affordance.

15. A method, comprising:
at an electronic device with a touch-sensitive display, one or more processors, and memory:
detecting a first user input;
in response to detecting the first user input:
displaying a first affordance, wherein selection of the first affordance initiates a telephone call to a determined number; and
while continuing to detect the first user input, initiating a countdown, wherein initiating the countdown includes displaying a visual indication of the countdown on the display, wherein the visual indication of the countdown is displayed at a location corresponding to the first affordance;
determining that the countdown has completed; and
in response to determining that the countdown has completed, causing initiation of the telephone call to the determined number.

16. The method of claim 15, further comprising:
determining whether a duration of the first user input exceeds a first predetermined amount of time,
wherein the countdown is initiated in accordance with a determination that the duration of the first user input exceeds the first predetermined amount of time.

17. The method of claim 16, further comprising:
determining whether the duration of the first user input exceeds a second predetermined amount of time, wherein the second predetermined amount of time is greater than the first predetermined amount of time; and
in accordance with a determination that the duration of the first user input exceeds the second predetermined amount of time, causing initiation of the telephone call to the determined number.

18. The method of claim 15, further comprising:
while displaying the visual indication of the countdown, providing a haptic output.

19. The method of claim 15, further comprising:
further in response to detecting the first user input and before the countdown is complete, causing preparation of the telephone call to the determined number.

20. The method of claim 15, further comprising:
after the telephone call is initiated, detecting a second user input including a contact on the touch-sensitive display, wherein the contact has a characteristic intensity;
determining whether the characteristic intensity of the contact exceeds a threshold intensity;
in accordance with a determination that the characteristic intensity of the contact exceeds the threshold intensity, displaying a second affordance;
detecting a third user input corresponding to selection of a third affordance; and
in response to detecting the third user input, causing the telephone call to end.

21. The method of claim 15, further comprising:
in response to causing initiation of the telephone call, causing at least one message to be sent to a predetermined set of contacts.

22. The method of claim 15, further comprising:
determining that the telephone call has ended; and
in response to determining that the telephone call has ended, causing at least one message to be sent to a predetermined set of contacts.

23. The method of claim 22, wherein the at least one message is caused to be sent a predetermined amount of time after determining that the telephone call has ended.

24. The method of claim 22, wherein the at least one message includes data indicating a location of the electronic device.

25. The method of claim 22, wherein the at least one message includes data indicating an emergency.

26. The method of claim 15, further comprising:
determining that the telephone call has ended; and
after determining that the telephone call has ended, displaying medical information.

27. The method of claim 15, wherein the first user input is a press of a physical button on the electronic device.

28. The method of claim 15, wherein initiating the countdown includes ceasing to display at least a portion of the first affordance.

29. A non-transitory computer-readable storage medium storing one or more programs, the one or more programs comprising instructions, which when executed by one or more processors of an electronic device with a touch-sensitive display, the one or more programs including instructions for:
detecting a first user input;
in response to detecting the first user input:
displaying a first affordance, wherein selection of the first affordance initiates a telephone call to a determined number; and
while continuing to detect the first user input, initiating a countdown, wherein initiating the countdown includes displaying a visual indication of the countdown on the display, wherein the visual indication of the countdown is displayed at a location corresponding to the first affordance;
determining that the countdown has completed; and
in response to determining that the countdown has completed, causing initiation of the telephone call to the determined number.

30. The non-transitory computer-readable storage medium of claim 29, the one or more programs further including instructions for:

determining whether a duration of the first user input exceeds a first predetermined amount of time, wherein the countdown is initiated in accordance with a determination that the duration of the first user input exceeds the first predetermined amount of time.

31. The non-transitory computer-readable storage medium of claim 30, the one or more programs further including instructions for:

determining whether the duration of the first user input exceeds a second predetermined amount of time, wherein the second predetermined amount of time is greater than the first predetermined amount of time; and in accordance with a determination that the duration of the first user input exceeds the second predetermined amount of time, causing initiation of the telephone call to the determined number.

32. The non-transitory computer-readable storage medium of claim 29, the one or more programs further including instructions for:

while displaying the visual indication of the countdown, providing a haptic output.

33. The non-transitory computer-readable storage medium of claim 29, the one or more programs further including instructions for:

further in response to detecting the first user input and before the countdown is complete, causing preparation of the telephone call to the determined number.

34. The non-transitory computer-readable storage medium of claim 29, the one or more programs further including instructions for:

after the telephone call is initiated, detecting a second user input including a contact on the touch-sensitive display, wherein the contact has a characteristic intensity;

determining whether the characteristic intensity of the contact exceeds a threshold intensity;

in accordance with a determination that the characteristic intensity of the contact exceeds the threshold intensity, displaying a second affordance;

detecting a third user input corresponding to selection of a third affordance; and in response to detecting the third user input, causing the telephone call to end.

35. The non-transitory computer-readable storage medium of claim 29, the one or more programs further including instructions for:

in response to causing initiation of the telephone call, causing at least one message to be sent to a predetermined set of contacts.

36. The non-transitory computer-readable storage medium of claim 29, the one or more programs further including instructions for:

determining that the telephone call has ended; and in response to determining that the telephone call has ended, causing at least one message to be sent to a predetermined set of contacts.

37. The non-transitory computer-readable storage medium of claim 36, wherein the at least one message is caused to be sent a predetermined amount of time after determining that the telephone call has ended.

38. The non-transitory computer-readable storage medium of claim 36, wherein the at least one message includes data indicating a location of the electronic device.

39. The non-transitory computer-readable storage medium of claim 36, wherein the at least one message includes data indicating an emergency.

40. The non-transitory computer-readable storage medium of claim 29, the one or more programs further including instructions for:

determining that the telephone call has ended; and after determining that the telephone call has ended, displaying medical information.

41. The non-transitory computer-readable storage medium of claim 29, wherein the first user input is a press of a physical button on the electronic device.

42. The non-transitory computer-readable storage medium of claim 29, wherein initiating the countdown includes ceasing to display at least a portion of the first affordance.

* * * * *